US011281453B1

(12) United States Patent
Ramachandran et al.

(10) Patent No.: US 11,281,453 B1
(45) Date of Patent: Mar. 22, 2022

(54) METHODS AND SYSTEMS FOR A HITLESS ROLLBACK MECHANISM DURING SOFTWARE UPGRADE OF A NETWORK APPLIANCE

(71) Applicant: Pensando Systems Inc., Milpitas, CA (US)

(72) Inventors: Hareesh Ramachandran, Bangalore (IN); Sarat Kamisetty, Bangalore (IN); Kalyan Bade, Bangalore (IN); Krishna Doddapaneni, Bangalore (IN); Karthi Mohanraj, Bangalore (IN)

(73) Assignee: Pensando Systems, Inc., Milpitas, CA (US)

( * ) Notice: Subject to any disclaimer, the term of this patent is extended or adjusted under 35 U.S.C. 154(b) by 0 days.

(21) Appl. No.: 17/143,037

(22) Filed: Jan. 6, 2021

(51) Int. Cl.
*G06F 8/65* (2018.01)

(52) U.S. Cl.
CPC ..................... *G06F 8/65* (2013.01)

(58) Field of Classification Search
USPC ........................................................ 717/171
See application file for complete search history.

(56) References Cited

U.S. PATENT DOCUMENTS

| | | | |
|---|---|---|---|
| 5,761,518 A | 6/1998 | Boehling et al. | |
| 8,069,293 B1 | 11/2011 | Rogan et al. | |
| 8,307,095 B2 | 11/2012 | Clark et al. | |
| 8,418,166 B2 | 4/2013 | Armstrong et al. | |
| 8,695,075 B2 | 4/2014 | Anderson et al. | |
| 8,745,205 B2 | 6/2014 | Anderson et al. | |
| 9,239,840 B1 | 1/2016 | Acharya | |
| 9,830,143 B2 | 11/2017 | Chigurapati et al. | |
| 9,843,624 B1 | 12/2017 | Taaghol et al. | |
| 9,967,144 B2 | 5/2018 | Kumarasamy et al. | |
| 9,996,338 B2 | 6/2018 | Dujmovic et al. | |
| 11,010,259 B1* | 5/2021 | Geng | G06F 11/1469 |
| 2003/0149608 A1 | 8/2003 | Kall et al. | |
| 2005/0132351 A1* | 6/2005 | Randall | G06F 11/1433 717/168 |

(Continued)

FOREIGN PATENT DOCUMENTS

| | | |
|---|---|---|
| CN | 102222010 A | 10/2011 |
| CN | 105700967 A | 6/2016 |
| WO | 2020132413 A1 | 6/2020 |

OTHER PUBLICATIONS

Weppenaaret et al., "Intelligent Maintenance Management in a Reconfigurable Manufacturing Environment Using Multi-Agent Systems", Jul. 2010, Central University of Technology (Year: 2010).

(Continued)

*Primary Examiner* — Wei Y Zhen
*Assistant Examiner* — Clint Thatcher
(74) *Attorney, Agent, or Firm* — Loza & Loza LLP

(57) ABSTRACT

A network appliance running a first firmware may roll back to that first firmware in a hitless manner during an unsuccessful upgrade to a second firmware. Before the attempted upgrade, a first process in the first firmware is providing a service. The upgrade process is initiated to upgrade the network appliance from the first firmware to a second firmware. The upgrade process can include stopping communication via a data plane of the network appliance to the first process, and detecting an upgrade failure. The upgrade process is hitless because rolling back the upgrade process occurs without halting the first firmware. Rolling back the upgrade includes restoring communications via the data plane to the first process.

20 Claims, 16 Drawing Sheets

(56) References Cited

U.S. PATENT DOCUMENTS

| | | | |
|---|---|---|---|
| 2007/0192863 A1 | 8/2007 | Kapoor et al. | |
| 2008/0120498 A1 | 5/2008 | Peterson et al. | |
| 2012/0054730 A1 | 3/2012 | Michishita | |
| 2012/0096250 A1 | 4/2012 | Aloni et al. | |
| 2012/0150805 A1 | 6/2012 | Pafumi et al. | |
| 2014/0258999 A1 | 9/2014 | Katihar et al. | |
| 2014/0289331 A1 | 9/2014 | Chan et al. | |
| 2017/0242686 A1 | 8/2017 | Vidyadhara et al. | |
| 2017/0344703 A1 | 11/2017 | Ansari et al. | |
| 2018/0074837 A1 | 3/2018 | Zhang et al. | |
| 2018/0152540 A1 | 5/2018 | Niell et al. | |
| 2018/0356989 A1 | 12/2018 | Meister et al. | |
| 2019/0034192 A1* | 1/2019 | Fox | G06F 11/3612 |
| 2019/0220260 A1* | 7/2019 | Gutman | G06F 11/1433 |
| 2020/0201624 A1 | 6/2020 | Halder et al. | |

OTHER PUBLICATIONS

Zellwegewr et al., "Decoupling Cores, Kernels, and Operating Systems", Oct. 2014, USENIX (Year: 2014).

Saghir et al., "Datapath and ISA Customization for Soft VLIW Processors", 2006, IEEE (Year: 2006).

Agilio Software, "Agilio® OVS Software Architecture", 2016, Netronorne Systems (Year: 2016).

PCT/US2019/067791 International Search Report and Written Opinion dated Apr. 28, 2020.

PCT/US2019/067791 Invitation to Pay Additional Fees dated Feb. 21, 2020.

\* cited by examiner

US 11,281,453 B1

METHODS AND SYSTEMS FOR A HITLESS ROLLBACK MECHANISM DURING SOFTWARE UPGRADE OF A NETWORK APPLIANCE

TECHNICAL FIELD

The embodiments relate to computer networks, cloud computing, data warehouses, data center operations and management, workload orchestration, network appliances, routers, switches, load balancers, packet processing pipelines, P4 packet processing pipelines, programmable packet processing pipelines implemented using special purpose circuitry, and HPC (high performance computing).

BACKGROUND

Data warehouses use a large number of network appliances such as switches, routers, and network interface cards installed in servers. A normal part of maintaining a data center is upgrading the network appliances. Upgrading the network appliances can interfere with the data warehouses' network traffic resulting in packet loss and lost connections. It is well known that rolling out such upgrades occasionally goes wrong. In such cases, the upgrade must be rolled back to a previous version, if possible. Rolling back upgrades causes even more interference with the data warehouses' network traffic.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented in a method implemented by a network appliance. The method can include running a first firmware that includes a first process that is providing a service via a network service port, initiating an upgrade process to upgrade the network appliance from the first firmware to a second firmware, stopping communication via the network service port to the first process as part of the upgrade process, detecting an upgrade failure during the upgrade process, rolling back the upgrade process without halting the first firmware, and restoring communications via the network service port to the first process as part of rolling back the upgrade process.

Another aspect of the subject matter described in this disclosure can be implemented by a network appliance. The network appliance can include a data plane, and a control plane. The control plane can be configured to run a first firmware that includes a first process that is providing a service, initiate an upgrade process to upgrade the network appliance from the first firmware to a second firmware, stop communication via a network service port to the first process as part of the upgrade process, detect an upgrade failure during the upgrade process, roll back the upgrade process without halting the first firmware, and restore communications via the network service port to the first process after detecting the upgrade failure.

Yet another aspect of the subject matter described in this disclosure can be implemented by a network appliance comprising a data plane, a means for running a first firmware concurrently with a second firmware, a means for upgrading the network appliance from the first firmware to the second firmware without restarting the network appliance, a means for stopping communication via a network service port to the first firmware while upgrading, a means for starting communication via the network service port to the second firmware while upgrading, a means for detecting an upgrade failure while upgrading, a means for rolling back the means for upgrading the network appliance without halting the first firmware, and a means for restoring communications via the network service port to the first firmware after detecting the upgrade failure.

In some implementations of the methods and devices, the upgrade process includes running the second firmware concurrently with and in isolation from the first firmware, the second firmware configured to run a second process that provides the service, producing a configuration state of the first process after stopping the communication via the network service port to the first process, spawning the second process in the second firmware in a consistent state that is based on the configuration state, and detecting the upgrade failure as an error related to the second process.

In some implementations of the methods and devices, the upgrade process includes quiescing a data plane of the network appliance while the second firmware is running and after stopping the communication via the network service port to the first process as part of the upgrade process, the upgrade process also includes configuring the network appliance to provide the service via the second process, and rolling back the upgrade process includes configuring the network appliance to provide the service via the first process.

In some implementations of the methods and devices, the upgrade process includes producing a first memory partition and a second memory partition in a memory of the network appliance, a plurality of first firmware processes are loaded in the first memory partition, a plurality of second firmware processes are loaded in the second memory partition, the first process is one of the first firmware processes, and the second process is one of the second firmware processes.

In some implementations of the methods and devices, the network appliance includes a memory configured to store a plurality of registers indicating a plurality of service entry points for a plurality of processes providing a plurality of services, the upgrade process includes rewriting the registers to indicate the service entry points within the second firmware, and rolling back the upgrade process includes restoring the registers to indicate the service entry points within the first firmware. In some implementations of the methods and devices, the upgrade process includes determining that an upgraded first data structure used by the second firmware differs from a first data structure used by the first firmware for a first state data, translating the first state data to produce an upgraded first state data based on the upgraded first data structure, and configuring the second firmware to access the upgraded first state data.

In some implementations of the methods and devices, the upgrade process includes determining a second data structure used by the second firmware is used by the first firmware for a second state data, and using a shared memory to provide the first firmware and the second firmware with access to the second state data. In some implementations of the methods and devices, the upgrade process includes receiving a configuration input via a peripheral component interconnect bus or an out of band connection via a data plane of the network appliance after stopping the communication via the network service port to the first process, and updating the first firmware and the second firmware based on the configuration input.

In some implementations of the methods and devices, the upgrade process includes creating a shadow memory region in a memory of the network appliance that shadows a pipeline memory region of the data plane, wherein the pipeline memory region stores packet processing pipeline executable code, updating the first firmware includes writing into the pipeline memory region, and updating the second firmware includes writing into the shadow memory region. In some implementations of the methods and devices, the upgrade process includes unloading the first firmware, and rolling back the upgrade process includes unloading the second firmware.

In some implementations of the methods and devices, the upgrade process includes running the second firmware concurrently with and in isolation from the first firmware, the second firmware configured to run a second process that provides the service, the upgrade process includes producing a configuration state of the first process after stopping the communication via the network service port to the first process, the upgrade process includes spawning the second process in the second firmware in a consistent state that is based on the configuration state, and the upgrade process includes detecting the upgrade failure as an error related to the second process. In some implementations of the methods and devices, the upgrade process includes determining that an upgraded first data structure used by the second firmware differs from a first data structure used by the first firmware for a first state data, the upgrade process includes partitioning a memory of the network appliance, the upgrade process includes translating the first state data to produce an upgraded first state data based on the upgraded first data structure, and the upgrade process includes configuring the second firmware to access the upgraded first state data.

In some implementations of the methods and devices, the upgrade process includes determining a second data structure used by the second firmware is used by the first firmware for a second state data, and the upgrade process includes using a shared memory to provide the first firmware and the second firmware with access to the second state data. In some implementations of the methods and devices, the upgrade process includes receiving a configuration input via a peripheral component interconnect bus or an out of band connection via the data plane after stopping the communication via the network service port to the first process, and the upgrade process includes updating the first firmware and the second firmware based on the configuration input.

In some implementations of the methods and devices, the upgrade process includes creating a shadow memory region in a memory of the network appliance that shadows a pipeline memory region of the data plane, the pipeline memory region stores packet processing pipeline executable code, updating the first firmware includes writing into the pipeline memory region, and updating the second firmware includes writing into the shadow memory region. In some implementations of the methods and devices, the network appliance includes a means for configuring a first memory region for the first firmware, a means for configuring a second memory region for the second firmware, a means for shadowing a pipeline memory region of the data plane, and a means for updating the first firmware and the second firmware based on a configuration input received after stopping communication via the network service port to the first firmware.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

DETAILED DESCRIPTION

Figure 1:
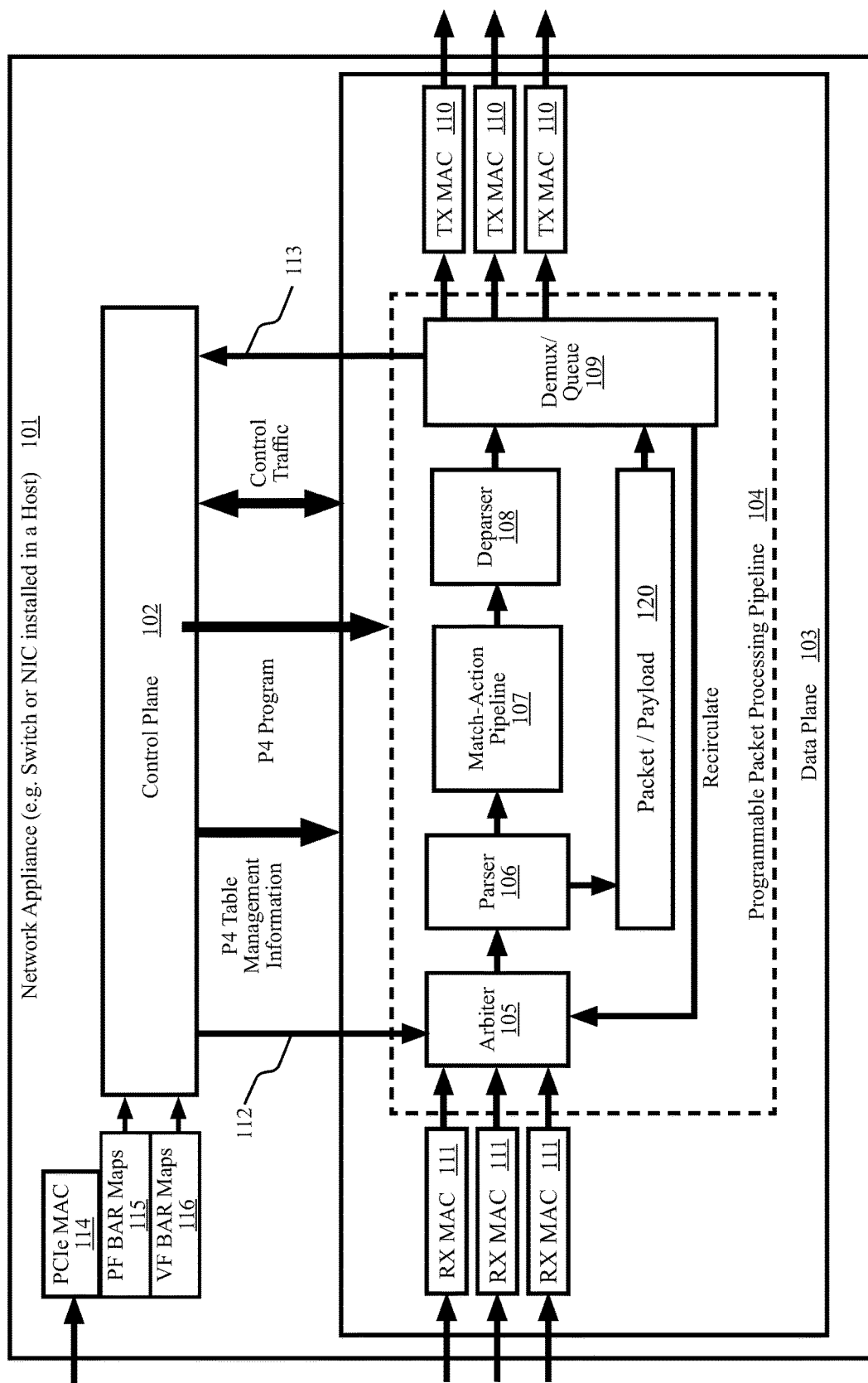
FIG. 1 is a functional block diagram of a network appliance having a control plane and a data plane and in which aspects may be implemented.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Rollback mechanisms are inevitable and should be an integral part of firmware upgrades. When an upgrade fails, rollback ensures that the overall health of the system state is restored and that the system can continue service. This is particularly true for network appliances such as switches, routers, and network interface cards (NICs). An effective, but inefficient, rollback mechanism often used by network appliances is a hard-hit restart of the network appliance's processes, or of the network appliance itself. Such restarts can lead to packet loss and traffic disruption in the network.

A hitless roll back mechanism can prevent packet loss and service disruption. To implement an upgrade with a hitless rollback mechanism, the upgrade process can run aspects of a second firmware, the upgraded firmware, in parallel with a first firmware that is being upgraded. The network appliance can continue providing network services via the first firmware while the second firmware receives state information from the first firmware. As such, the second firmware, if it is operating properly, can assume responsibility for providing the network services. If there is an error in the upgrade process, then the second firmware can be unloaded. Otherwise, the second firmware takes over and the first firmware is unloaded. The result is that the network appliance can provide network services during an upgrade and during a rollback. Hitless rollback has been achieved.

An advantage of a hitless rollback mechanism is that the processes depending on the network appliance are not impacted. A hard-hit restart could break the connections to back end databases, to load balancers, and to other critical infrastructure. Applications running in the data center could therefore suffer a service outage and need to recover and reconnect. Another advantage is improved service uptime. Data warehouses often agree to provide a specified quality of service and attract clients by providing a high quality of service. Service disruptions have a negative impact on quality of service metrics. A hitless rollback mechanism makes a whole class of service disruptions avoidable.

In the field of data networking, the functionality of network appliances such as switches, routers, and NICs are often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows, which include I/O and InfiniBand traffic flows, extremely quickly if the match-action pipeline is configured to process those traffic flows. Upon receiving a packet of a network traffic flow, the match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match-action pipeline is not yet configured to process. If there is no match, then the match-action pipeline can perform a default action.

The high-volume and rapid decision-making that occurs at the data plane is often implemented in fixed function application specific integrated circuits (ASICs). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing. Although FPGAs are able to provide a high level of flexibility for data plane processing, FPGAs are relatively expensive to produce and consume much more power than ASICs on a per-packet basis.

FIG. 1 is a functional block diagram of a network appliance having a control plane and a data plane and in which aspects may be implemented. A network appliance 101 can have a control plane 102 and a data plane 103. The control plane provides forwarding information (e.g., in the form of table management information) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. The control plane may implement operations related to packet routing that include InfiniB and channel adapter management functions, Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). The data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The P4 domain-specific language for programming the data plane of network appliances is currently defined in the "P416 Language Specification," version 1.2.0, as published by the P4 Language Consortium on Oct. 23, 2019, which is incorporated by reference herein. P4 (also referred to herein as the "P4 specification," the "P4 language," and the "P4 program") is designed to be implementable on a large variety of targets including switches, routers, programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The data plane 103 includes multiple receive media access controllers (MACs) (RX MAC) 111 and multiple transmit MACs (TX MAC) 110. The RX MACs 111 implement media access control on incoming packets via, for example, a MAC protocol such as Ethernet. The MAC protocol can be Ethernet and the RX MACs can be configured to implement operations related to, for example, receiving frames, half-duplex retransmission and back-off functions, Frame Check Sequence (FCS), interframe gap enforcement, discarding malformed frames, and removing the preamble, Start Frame Delimiter (SFD), and padding from a packet. Likewise, the TX MACs 110 implement media access control on outgoing packets via, for example, Ethernet. The TX MACs can be configured to implement operations related to, for example, transmitting frames, half-duplex retransmission and back-off functions, appending an FCS, interframe gap enforcement, and prepending a preamble, an SFD, and padding.

As illustrated in FIG. 1, a P4 program is provided to the data plane 103 via the control plane 102. Communications between the control plane and the data plane can use a dedicated channel or bus, can use shared memory, etc. The P4 program includes software code that configures the functionality of the data plane 103 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane corresponds to a class of algorithms that describe transformations on packets by packet processing systems.

The data plane 103 includes a programmable packet processing pipeline 104 that is programmable using a domain-specific language such as P4 and that can be used to implement the programmable packet processing pipeline 104. As described in the P4 specification, a programmable packet processing pipeline can include an arbiter 105, a parser 106, a match-action pipeline 107, a deparser 108, and a demux/queue 109. The data plane elements described may be implemented as a P4 programmable switch architecture, as a P4 programmable NIC, as a P4 programmable router, or some other architecture. The arbiter 105 can act as an ingress unit receiving packets from RX-MACs 111 and can also receive packets from the control plane via a control plane packet input 112. The arbiter 105 can also receive packets that are recirculated to it by the demux/queue 109. The demux/queue 109 can act as an egress unit and can also be configured to send packets to a drop port (the packets thereby disappear), to the arbiter via recirculation, and to the control plane 102 via an output CPU port 113. The control plane is often referred to as a CPU (central processing unit) although, in practice, control planes often include multiple CPU cores and other elements. The arbiter 105 and the demux/queue 109 can be configured through the domain-specific language (e.g., P4).

The parser 106 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. The information extracted from a packet by the parser can be referred to as a packet header vector or "PHV." The parser can identify certain fields of the header and can extract the data corresponding to the identified fields to generate the PHV. The PHV may include other data (often referred to as "metadata") that is related to the packet but not extracted directly from the header, including for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 108 is a programmable element that is configured through the domain-specific language (e.g., P4) to generate packet headers from PHVs at the output of match-action pipeline 107 and to construct outgoing packets by reassembling the header(s) (e.g., Ethernet and IP headers, InfiniBand PDUs, etc.) as determined by the match-action pipeline. In some cases, a packet/payload may travel in a separate queue or buffer 120, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 108) before the demux/queue 109 sends the packet to the TX MAC 110 or recirculates it back to the arbiter 105 for additional processing.

A network appliance 101 can have a peripheral component interconnect extended (PCIe) interface such as PCIe media access control (MAC) 114. A PCIe MAC can have a base address register (BAR) at a base address in a host system's memory space. Processes, typically device drivers within the host system's operating system, can communicate with a NIC via a set of registers beginning with the BAR. Some PCIe devices are single root input output virtualization (SR-IOV) capable. Such PCIe devices can have a physical function (PF) and multiple virtual functions (VFs). A PF BAR map 115 can be used by the host machine to communicate with the PCIe card. A VF BAR map 116 can be used by a virtual machine (VM) running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an InfiniBand channel adapter via another PF. As such, the NIC can provide "NIC" VFs and "InfiniBand" VFs to VMs running on the host. The InfiniBand PF and VFs can be used for data transfers, such as RDMA transfers to other VMs running on the same or other host computers. Similarly, a NIC can provide NVMe and SCSI PFs and VFs to VMs running on the host.

Figure 2:
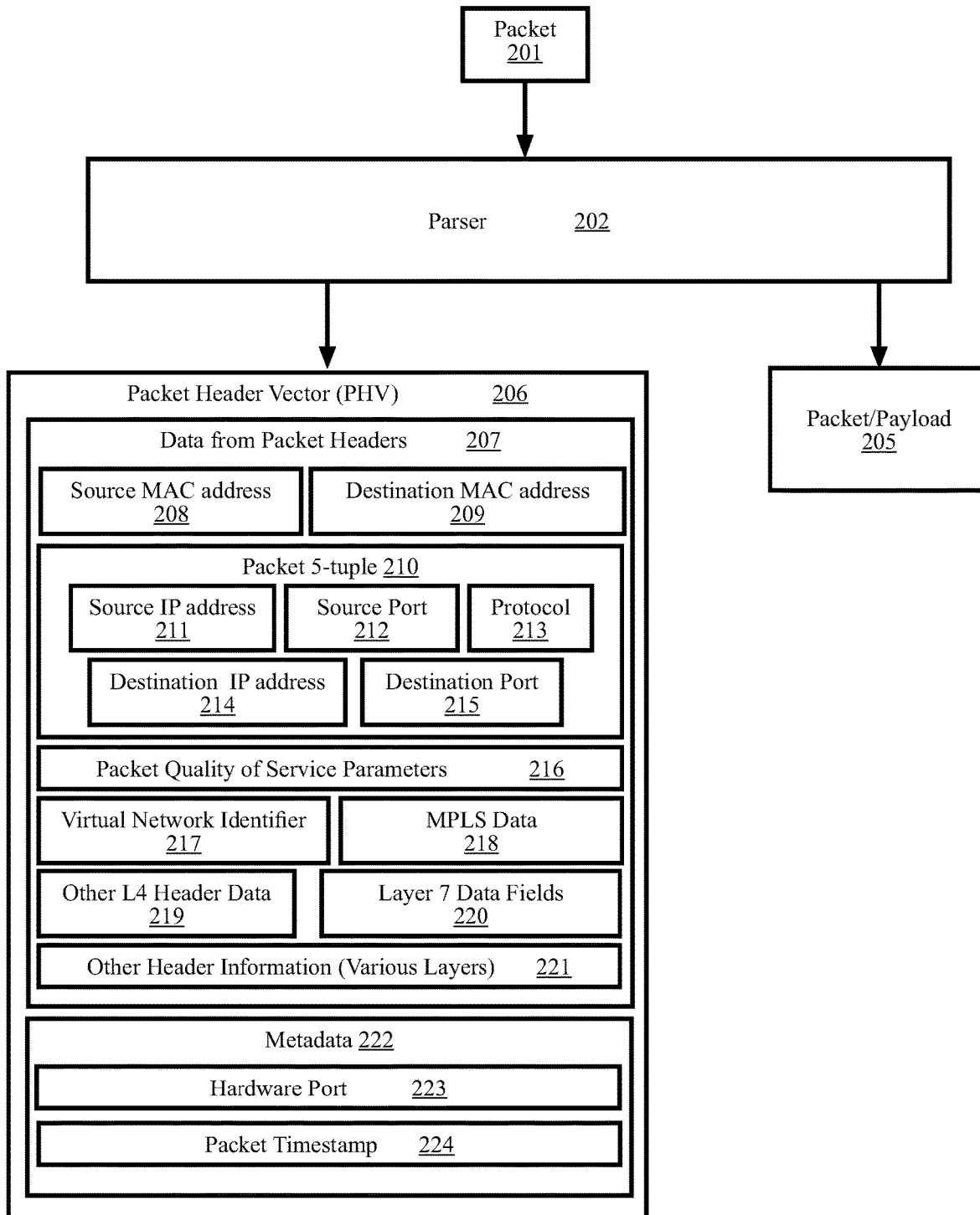
FIG. 2 is a high-level diagram illustrating an example of generating a packet header vector from a packet according to some aspects.

FIG. 2 is a high-level diagram illustrating an example of generating a packet header vector 206 from a packet 201 according to some aspects. The parser 202 can receive a packet 201 that has layer 2, layer 3, layer 4, and layer 7 headers and payloads. The parser can generate a packet header vector (PHV) from packet 201. The packet header vector 206 can include many data fields including data from packet headers 207 and metadata 222. The metadata 222 can include data generated by the network appliance such as the hardware port 223 on which the packet 201 was received and the packet timestamp 224 indicating when the packet 201 was received by the network appliance.

The source MAC address 208 and the destination MAC address 209 can be obtained from the packet's layer 2 header. The source IP address 211 can be obtained from the packets layer 3 header. The source port 212 can be obtained from the packet's layer 4 header. The protocol 213 can be obtained from the packet's layer 3 header. The destination IP address 214 can be obtained from the packet's layer 3 header. The destination port 215 can be obtained from the packets layer 4 header. The packet quality of service parameters 216 can be obtained from the packet's layer 3 header or another header based on implementation specific details. The virtual network identifier 217 may be obtained from the packet's layer 2 header. The multi-protocol label switching (MPLS) data 218, such as an MPLS label, may be obtained from the packet's layer 2 header. The other layer 4 data 219 can be obtained from the packet's layer 4 header. The L7 data fields 220 can be obtained from the packet's layer 7 header or layer 7 payload. The other header information 221 is the other information contained in the packet's layer 2, layer 3, layer 4, and layer 7 headers.

The packet 5-tuple 210 is often used for generating keys for match tables, discussed below. The packet 5-tuple 210 can include the source IP address 211, the source port 212, the protocol 213, the destination IP address 214, and the destination port 215.

Those practiced in computer networking protocols realize that the headers carry much more information than that described here, realize that substantially all of the headers are standardized by documents detailing header contents and fields, and know how to obtain those documents. The parser can also be configured to output a packet or payload 205. Recalling that the parser 202 is a programmable element that is configured through the domain-specific language (e.g., P4) to extract information from a packet, the specific contents of the packet or payload 205 are those contents specified via the domain specific language. For example, the contents of the packet or payload 205 can be the layer 3 payload.

Figure 3:
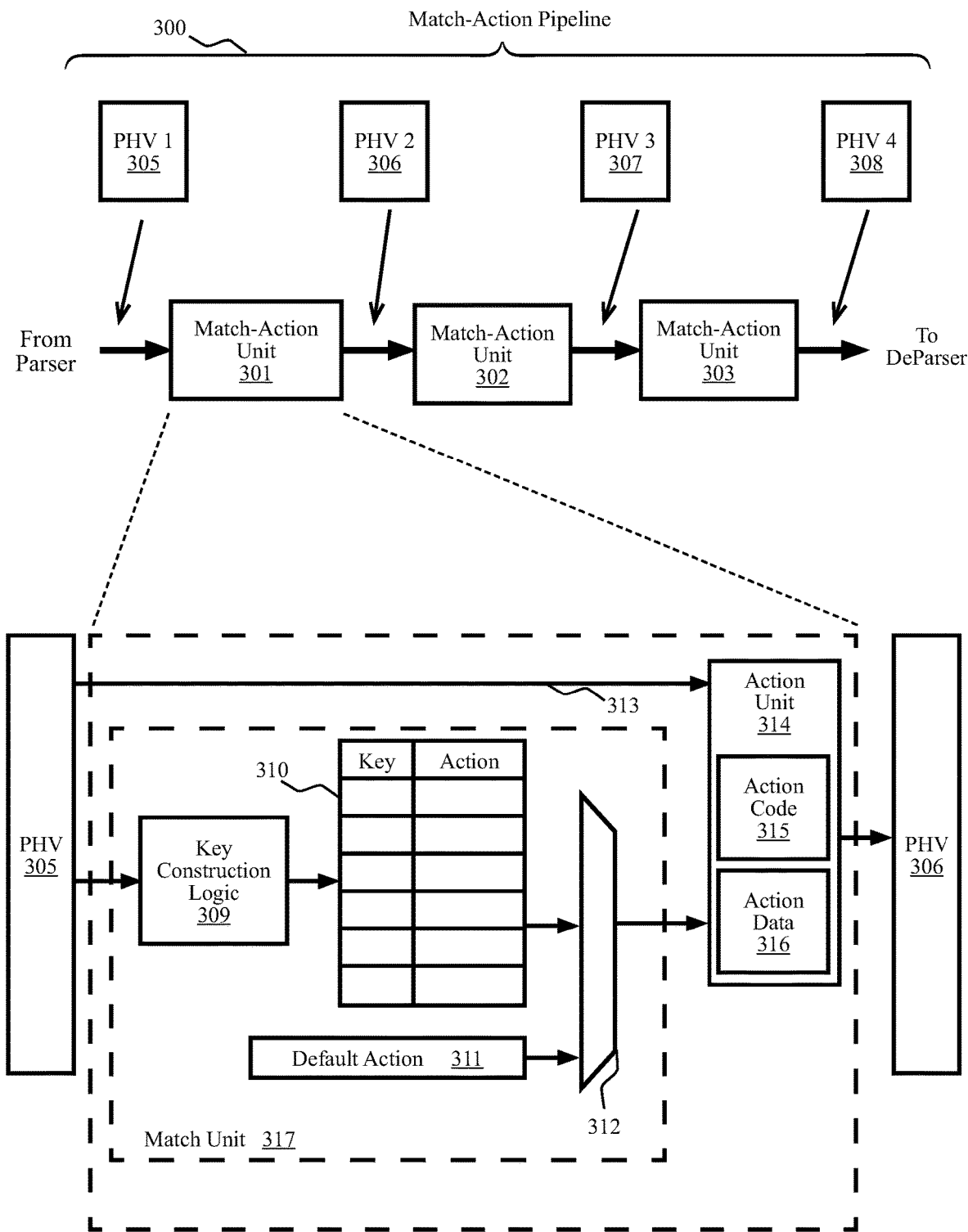
FIG. 3 is a functional block diagram illustrating an example of a match-action unit in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units 301, 302, 303 of the match-action pipeline 300 are programmed to perform "match-action" operations in which a match unit performs a lookup using at least a portion of the PHV and an action unit performs an action based on an output from the match unit. A PHV generated at the parser may be passed through each of the match-action units in the match-action pipeline in series and each match-action unit implements a match-action operation. The PHV and/or table entries may be updated in each stage of match-action processing according to the actions specified by the P4 programming. In some instances, a packet may be recirculated through the match-action pipeline, or a portion thereof, for additional processing. Match-action unit 1 301 receives PHV 1 305 as an input and outputs PHV 2 306. Match-action unit 2 302 receives PHV 2 306 as an input and outputs PHV 3 307. Match-action unit 3 303 receives PHV 3 307 as an input and outputs PHV 4 308.

An expanded view of elements of a match-action unit 301 of match-action pipeline 300 is shown. The match-action unit includes a match unit 317 (also referred to as a "table engine") that operates on an input PHV 305 and an action unit 314 that produces an output PHV 306, which may be a modified version of the input PHV 305. The match unit 317 can include key construction logic 309, a lookup table 310, and selector logic 312. The key construction logic 309 is configured to generate a key from at least one field in the PHV (e.g. 5-tuple, InfiniBand queue pair identifiers, etc.). The lookup table 310 is populated with key-action pairs, where a key-action pair can include a key (e.g., a lookup key) and corresponding action code 315 and/or action data 316. A P4 lookup table may be viewed as a generalization of traditional switch tables, and can be programmed to implement, for example, routing tables, flow lookup tables, ACLs, and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. The operations of the match-action unit can be programmable by the control plane via P4 and the contents of the lookup table are managed by the control plane.

Figure 4:
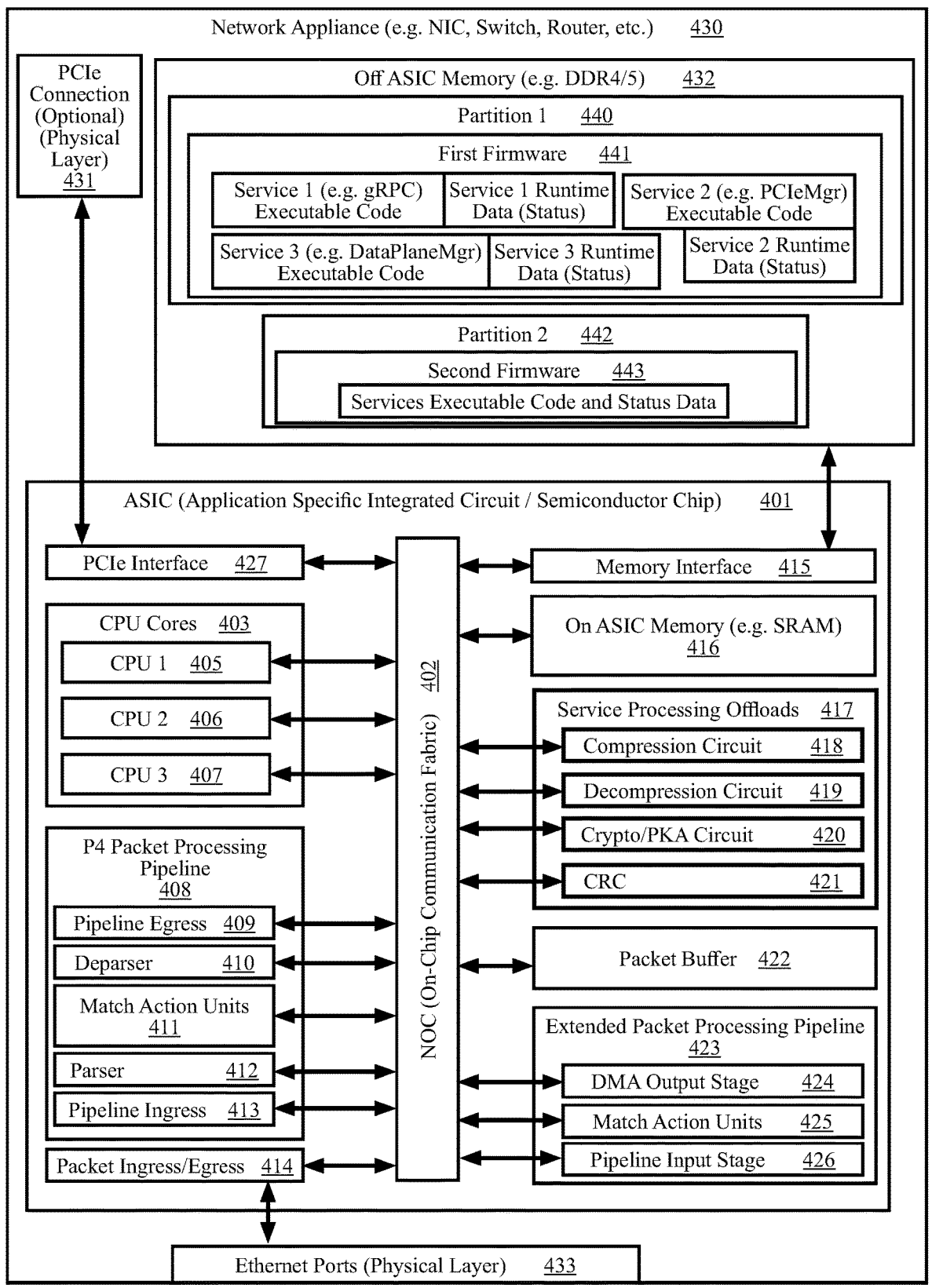
FIG. 4 is a functional block diagram of a network appliance having an ASIC (application specific integrated circuit), according to some aspects.

FIG. 4 is a functional block diagram of a network appliance 430 having an ASIC (application specific integrated circuit) 401, according to some aspects. If the network appliance is a network interface card (NIC) then the NIC can be installed in a host computer and can act as a network appliance for the host computer and for virtual machines running on the host computer. Such a NIC can have a PCIe connection 431 for communicating with the host computer. The network appliance 430 can have an ASIC 401, off ASIC memory 432, and ethernet ports 433. The off ASIC memory 432 can be one of the widely available memory modules or chips such as double data rate 4 (DDR4) synchronous dynamic random-access memory (SDRAM) such that the ASIC has access to many gigabytes of memory on the network appliance 430. The ethernet ports 433 provide physical connectivity to a computer network such as the internet.

The ASIC 401 is a semiconductor chip having many core circuits interconnected by an on-chip communications fabric, sometimes called a network on a chip (NOC) 402. NOCs are often implementations of standardized communications fabrics such as the widely used AXI bus. The ASIC's core circuits can include a PCIe interface 427, CPU cores 403, P4 packet processing pipeline 408 elements, memory interface 415, on ASIC memory (e.g. SRAM) 416, service processing offloads 417, a packet buffer 422, extended packet processing pipeline 423, and packet ingress/egress circuits 414. The PCIe interface 427 can be used to communicate with a host computer via the PCIe connection 431. The CPU cores 403 can include numerous CPU cores such as CPU 1 405, CPU 2 406, and CPU 3 407. The P4 packet processing pipeline 408 can include a pipeline ingress circuit 413, a parser circuit 412, match-action units 411, a deparser circuit 410, and a pipeline egress circuit 409. The service processing offloads 417 are circuits implementing functions that the ASIC uses so often that the designer has chosen to provide hardware for offloading those functions from the CPUs. The service processing offloads can include a compression circuit 418, decompression circuit 419, a crypto/PKA circuit 420, and a CRC calculation circuit 421. The specific core circuits implemented within the non-limiting example of ASIC 401 have been selected such that the ASIC implements many, perhaps all, of the functionality of an InfiniBand channel adapter, of an NVMe card, and of a network appliance that processes network traffic flows carried by IP (internet protocol) packets.

The P4 packet processing pipeline 408 is a specialized set of elements for processing network packets such as IP (internet protocol) packets and InfiniBand PDUs (protocol data units). The P4 pipeline can be configured using a domain-specific language. The concept of a domain-specific language for programming protocol-independent packet processors, known simply as "P4," has developed as a way to provide some flexibility at the data plane of a network appliance. The P4 domain-specific language for programming the data plane of network appliances is currently defined in the "P416 Language Specification," version 1.2.0, as published by the P4 Language Consortium on Oct. 23, 2019. P4 (also referred to herein as the "P4 specification," the "P4 language," and the "P4 program") is designed to be implementable on a large variety of targets including switches, routers, programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The network appliance 430 can include a memory 432 for running Linux or some other operating system and for storing data used by the processes implementing network services. A network appliance that has a hitless rollback mechanism can have a first memory partition 440 that can be used by a first firmware 441 and can have a second memory partition 442 that can be used by a second firmware 443. By using different partitions, the first firmware and the second firmware can run in isolation from one another. The partitions can store executable code for implementing services and can store status data used by those services. The services can include service 1, service 2, and service 3. Service 1 can be provided by a gRPC remote procedure call (note, gRPC is a recursive acronym) server. Service 2 can be provided by a PCIe manager, shown as PCIeMgr, that can handle PCIe bus communications and configuration. Service 3 can be provided by a data plane manager, shown as DataPlaneMgr, that can configure the data plane via, for example, P4 programming, installing forwarding rules, etc.

The CPU cores 403 can be general purpose processor cores, such as ARM processor cores, MIPS processor cores, and/or x86 processor cores, as is known in the field. Each CPU core can include a memory interface, an ALU, a register bank, an instruction fetch unit, and an instruction decoder, which are configured to execute instructions independently of the other CPU cores. The CPU cores may be Reduced Instruction Set Computers (RISC) CPU cores that are programmable using a general-purpose programming language such as C.

The CPU cores 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 403 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the network interfaces 433 to packet processing elements of the data plane and vice-versa. The packet processing elements can include a slow data path implemented in software and a fast data path implemented by packet processing circuitry 408, 423.

The packet processing circuitry 408, 423 can be a specialized circuit or part of a specialized circuit using one or more ASICs or FPGAs to implement programmable packet processing pipelines such as the programmable packet processing pipeline 104 of FIG. 1. Some embodiments include ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU cores 403 and memory 432 are configured via software to implement a slow data path. A network appliance having two data paths has a fast data path and a slow data path when one of the data paths processes packets faster than the other data path.

The ASIC 401 is illustrated with a P4 packet processing pipeline 408 and an extended packet processing pipeline 423. The extended packet processing pipeline is a packet processing pipeline that has a direct memory access (DMA) output stage 424. The extended packet processing pipeline has match-action units 425 that can be arranged as a match-action pipeline such as match-action pipeline 300. The extended packet processing pipeline has a pipeline input stage 426 that can receive PHVs or directives to perform operations. For example, data in the PHV can indicate that the PHV is a directive for implementing an RDMA operation. The key construction logic 309 of the MPUs can use the data to form a key that indexes into a lookup table 310 to locate an action. The MPUs can thereby execute actions such that the DMA output stage 424 writes InfiniB and PDU payload data into the off ASIC memory 432 or into the host memory.

All memory transactions in the network appliance 430, including host memory transactions, on board memory transactions, and registers reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuits 408, 423, CPU cores 403, memory interface 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
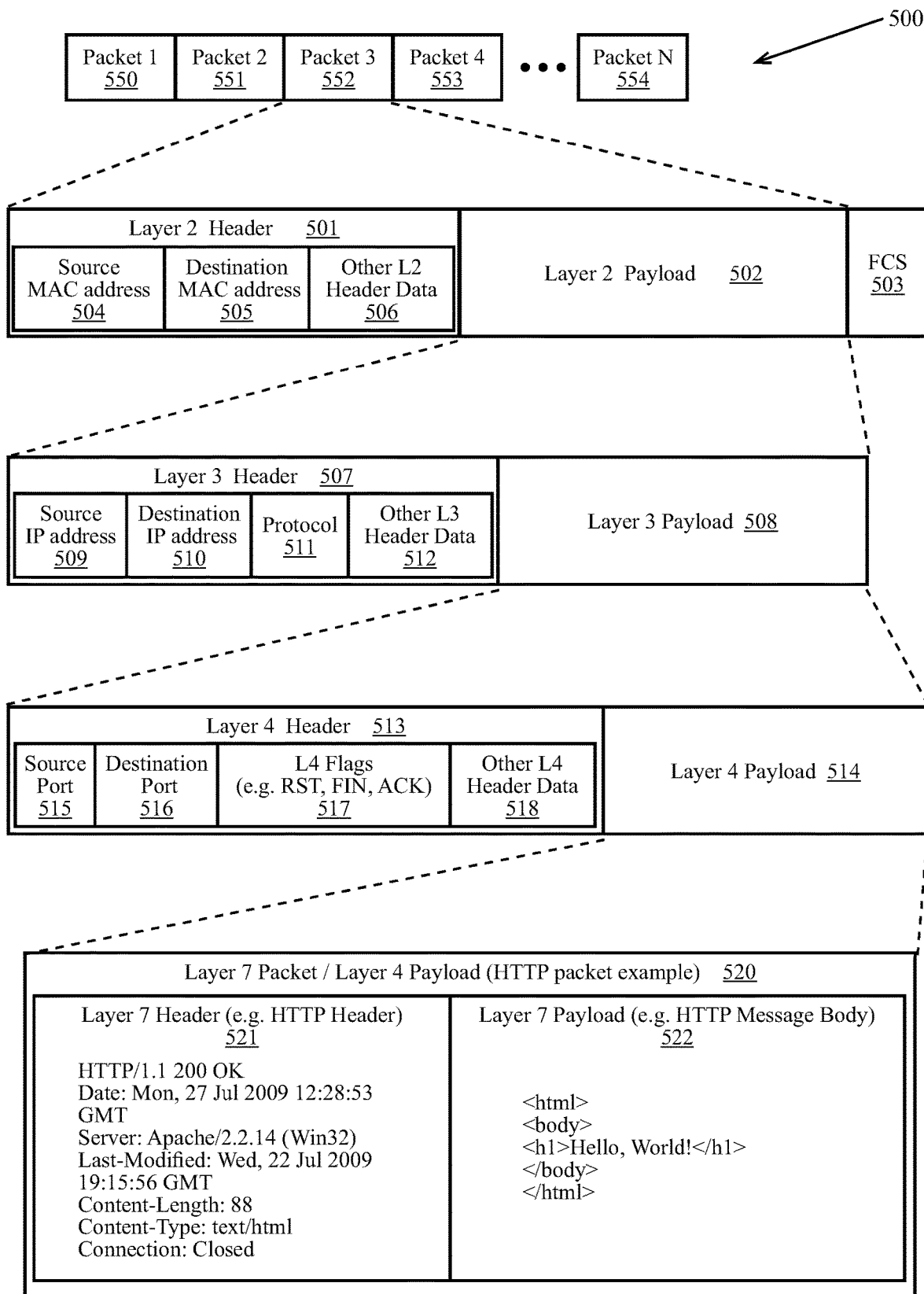
FIG. 5 illustrates packet headers and payloads of packets for network traffic flows including layer 7 fields according to some aspects.

FIG. 5 illustrates packet headers and payloads of packets for network traffic flows 500 including layer 7 fields according to some aspects. A network traffic flow 500 can have numerous packets such as a first packet 550, a second packet 551, a third packet 552, a fourth packet 553, and a final packet 554 with many more packets between the fourth packet 553 and the final packet 554. The term "the packet" or "a packet" can refer to any of the packets in a network traffic flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 111 as a raw bit stream or transmitted by TX MAC 110 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet has a layer 2 header 501, a layer 2 payload 502, and a layer 2 frame check sequence (FCS) 503. The layer 2 header can contain a source MAC address 504, a destination MAC address 505, and other layer 2 header data 506. The input ports 111 and output ports 110 of a network appliance 101 can have MAC addresses. A network appliance 101 can have a MAC address that is applied to all or some of the ports. Alternatively, a network appliance may have one or more ports that each have their own MAC address. In general, each port can send and receive packets. As such, a port of a network appliance can be configured with a RX MAC 111 and a TX MAC 110. Ethernet, also known as Institute of Electrical and Electronics Engineers (IEEE) 802.3, is a layer 2 protocol. IEEE 802.11 (WiFi) is another widely used layer 2 protocol. The layer 2 payload 502 can include a Layer 3 packet. The layer 2 FCS 503 can include a CRC (cyclic redundancy check) calculated from the layer 2 header and layer 2 payload. The layer 2 FCS can be used to verify that the packet has been received without errors.

The internet layer, often called layer 3, is the network layer where layer 3 packets can be routed from a first node to a second node across multiple intermediate nodes. The nodes can be network appliances such as network appliance 101. Internet protocol (IP) is a commonly used layer 3 protocol. The layer 3 packet can have a layer 3 header 507 and a layer 3 payload 508. The layer 3 header 507 can have a source IP address 509, a destination IP address 510, a protocol indicator 511, and other layer 3 header data 512. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 504 indicating the first node, a destination MAC address 505 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 504 indicating the intermediate node, a destination MAC address 505 indicating the second node, and the IP packet as a payload. The layer 3 payload 508 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 507 using protocol indicator 511. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 508 includes a TCP header and a TCP payload. UDP can provide for computer applications to send messages, in this case referred to as datagrams, to other hosts on an IP network using a connectionless model. When carrying UDP data, a layer 3 payload 508 includes a UDP header and a UDP payload. ICMP is used by network devices, including routers, to send error messages and operational information indicating success or failure when communicating with another IP address. ICMP uses a connectionless model.

A layer 4 packet can have a layer 4 header 513 and a layer 4 payload 514. The layer 4 header 513 can include a source port 515, destination port 516, layer 4 flags 517, and other layer 4 header data 518. The source port and the destination port can be integer values used by host computers to deliver packets to application programs configured to listen to and send on those ports. The layer 4 flags 517 can indicate a status of or action for a network traffic flow. For example, TCP has the RST, FIN, and ACK flags. RST indicates a TCP connection is to be immediately shut down and all packets discarded. A TCP FIN flag can indicate the final transmission on a TCP connection, packets transmitted before the FIN packet may be processed. ACK acknowledges received packets. A recipient of a FIN packet can ACK a FIN packet before shutting down its side of a TCP connection. A traffic flow can be terminated by a flow termination dialog. Examples of flow termination dialogs include: a TCP RST packet (with or without an ACK); and a TCP FIN packet flowed by a TCP ACK packet responsive to the TCP FIN packet. Other protocols also have well known flow termination dialogs. A layer 4 payload 514 can contain a layer 7 packet.

The application layer, often called layer 7, includes the protocols used by most applications for providing user services or exchanging application data over the network connections established by the lower level protocols. Examples of application layer protocols include RoCE v2 (RDMA over Converged Ethernet version 2), HTTP (Hypertext Transfer Protocol), FTP (File Transfer Protocol), SMTP (Simple Mail Transfer Protocol), and DHCP (Dynamic Host Configuration). Data coded according to application layer protocols can be encapsulated into transport layer protocol units (such as TCP or UDP messages), which in turn use lower layer protocols to effect actual data transfer.

A layer 4 payload 514 may include a layer 7 packet 520. A layer 7 packet can have a layer 7 header 521 and a layer 7 payload 522. The illustrated layer 7 packet is an HTTP packet. The layer 7 header 521 is an HTTP header, and the layer 7 payload 522 is an HTTP message body. The HTTP message body is illustrated as a hypertext markup language (HTML) document. HTTP is specified in requests for comment (RFCs) published by the Internet Engineering Task Force (IETF). IETF RFC 7231 specifies HTTP version 1.1. IETF RFC 7540 specifies HTTP version 2. HTTP version 3 is not yet standardized, but a draft standard has been published by the IETF as "draft-ietf-quic-http-29". HTML is a "living" standard that is currently maintained by Web Hypertext Application Technology Working Group (WHATWG). The HTTP header can be parsed by a P4 pipeline because it has a well-known format having well known header fields. Similarly, HTML documents can be parsed, at least in part, by a P4 pipeline to the extent that the HTML document has specific fields, particularly if those specific fields reliably occur at specific locations within the HTML document. Such is often the case when the backends consistently respond by providing HTML documents.

Figure 6:
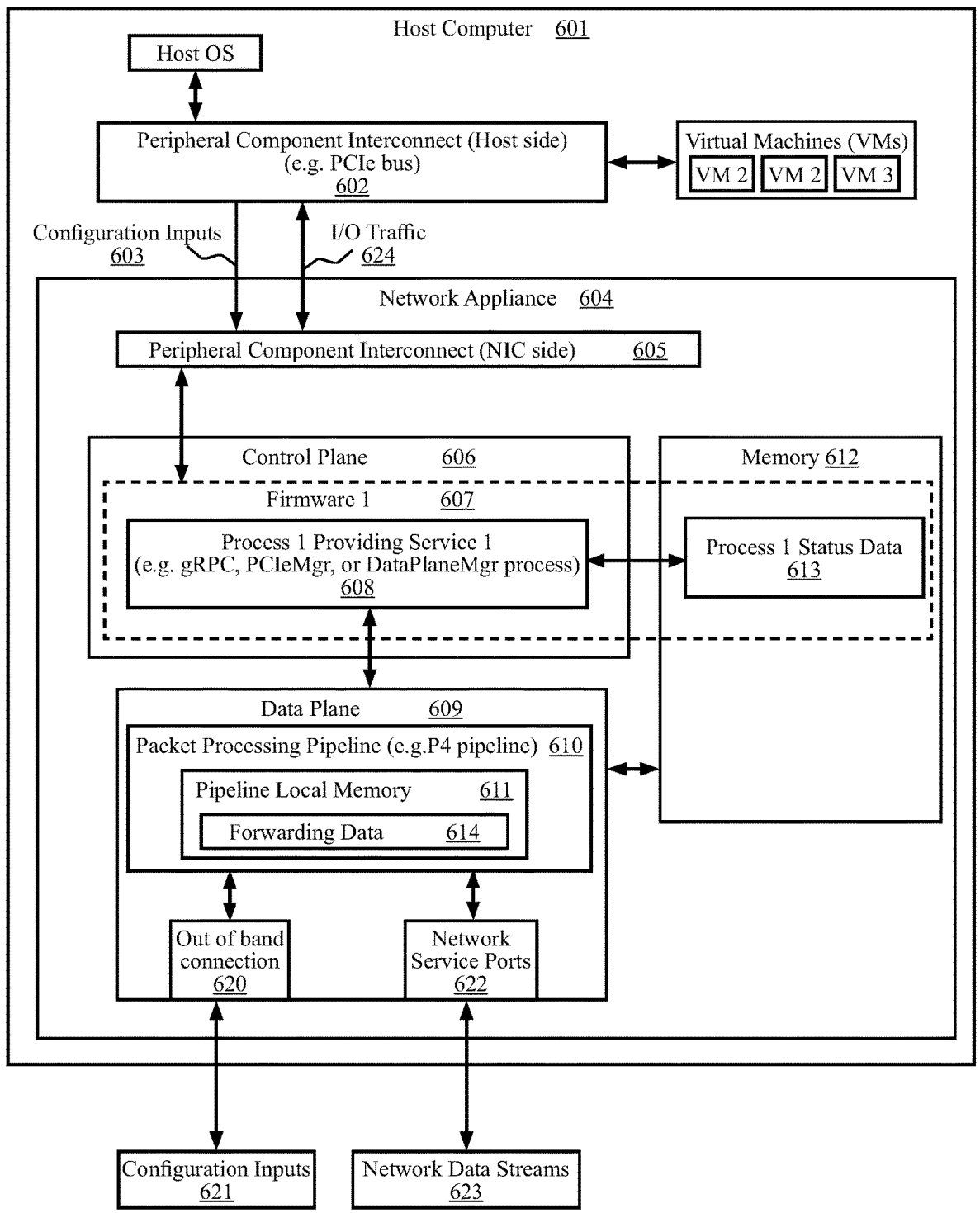
FIG. 6 illustrates a network appliance installed in a host computer and running a first firmware before starting a hitless upgrade process according to some aspects.

FIG. 6 illustrates a network appliance 604 installed in a host computer 601 and running a first firmware 607 before starting a hitless upgrade process according to some aspects. The illustrated network appliance is a NIC. As such, the first firmware 607 is shown running a PCIe manager process. Network appliances that are not installed host computers may not have a PCIe manager process. The host computer 601 runs a host operating system and can run virtual machines (VMs). The host computer 601 and the VMs can access the network appliance 604 using a host side peripheral component interconnect 602 that is communicatively connected to a NIC side peripheral component interconnect 605. The host computer and VMs can send configuration inputs 603 to and exchange I/O traffic 624 with the NIC via the peripheral component interconnects. The configuration inputs 603 and I/O traffic can be provided to the control plane 606 for processing. The I/O traffic 624 can include communications between the host computer 601, the VMs, and the outside world via network service ports 622.

The network appliance 604 can receive configuration inputs 603 from the host as well as configuration inputs 621 through an out of band connection 620. The configuration inputs can be used for interacting with and configuring the network appliance's operating system, the firmware, etc. For example, the configuration inputs can use application program inputs (APIs) surfaced via the configuration inputs, can open remote terminals, etc.

Before the upgrade process begins, a single firmware, the first firmware 607, is running on the network appliance 604. The firmware can run numerous processes such as gRPC, PCIeMgr, DataPlaneMgr, DHCP, DNS, etc. that provide services. The first process 608 can be one of those processes and can provide a service. The service can be a network service using a port. Recalling FIG. 5, network packets can specify a port at layer 4. The specified port can indicate which network service is to receive the data in the network packet. The network appliance's memory 612 stores the first process status data 613 for the first process 608. The data plane 609 is processing network data streams 623 passing through the network service ports 622 and through the PCIe bus as I/O inputs.

The data plane 609 can process network data streams 623 and I/O traffic 624 based on forwarding data 614 stored in a pipeline memory region of the data plane such as pipeline local memory 611. The pipeline memory region may be a portion of the pipeline local memory that is storing data for the first firmware. The packet processing pipeline 610 can use the forwarding data to rewrite network packets and to forward them toward their destinations.

Figure 7:
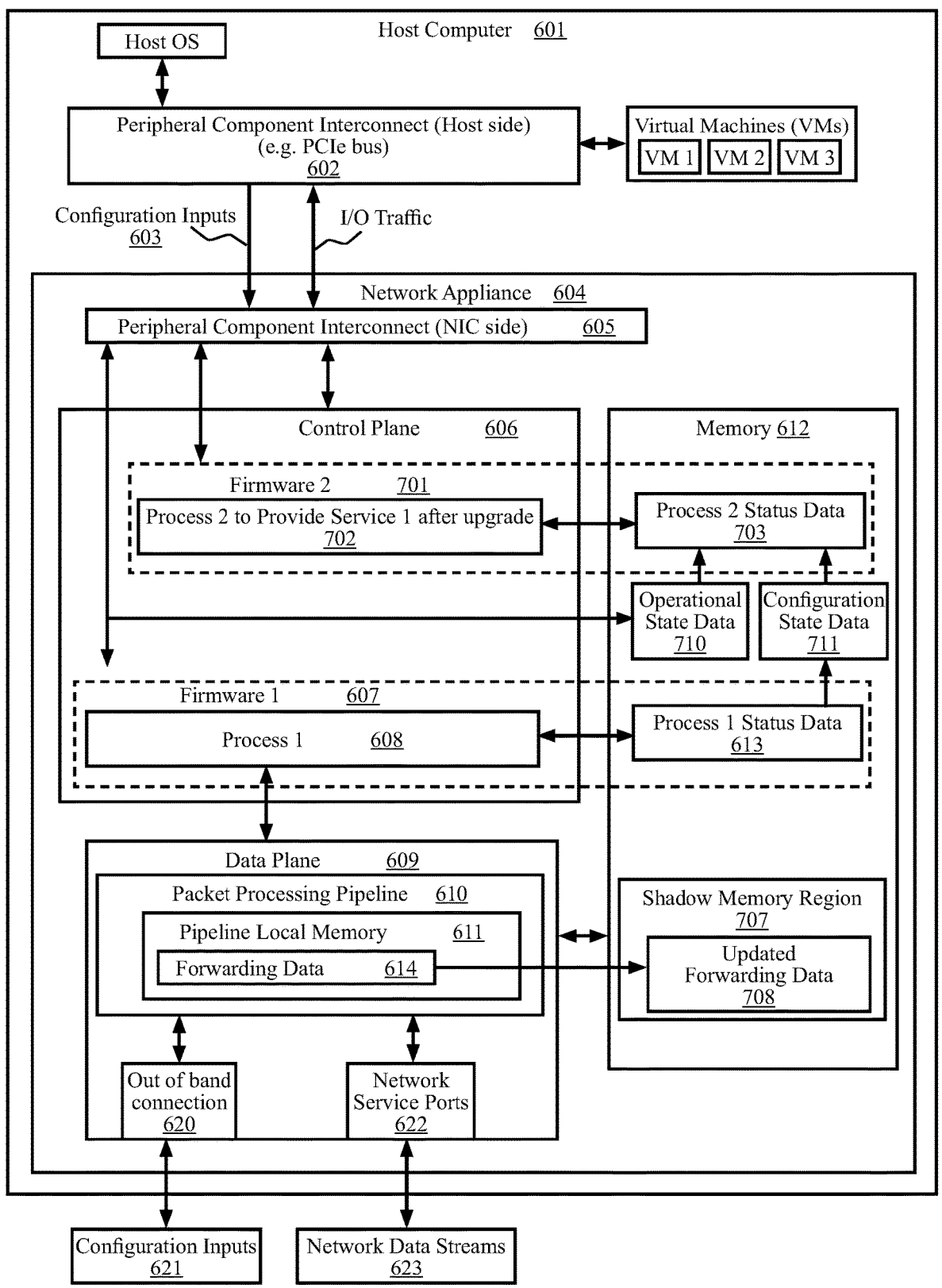
FIG. 7 illustrates a network appliance installed in a host computer during a hitless upgrade process according to some aspects.
Figure 9A:
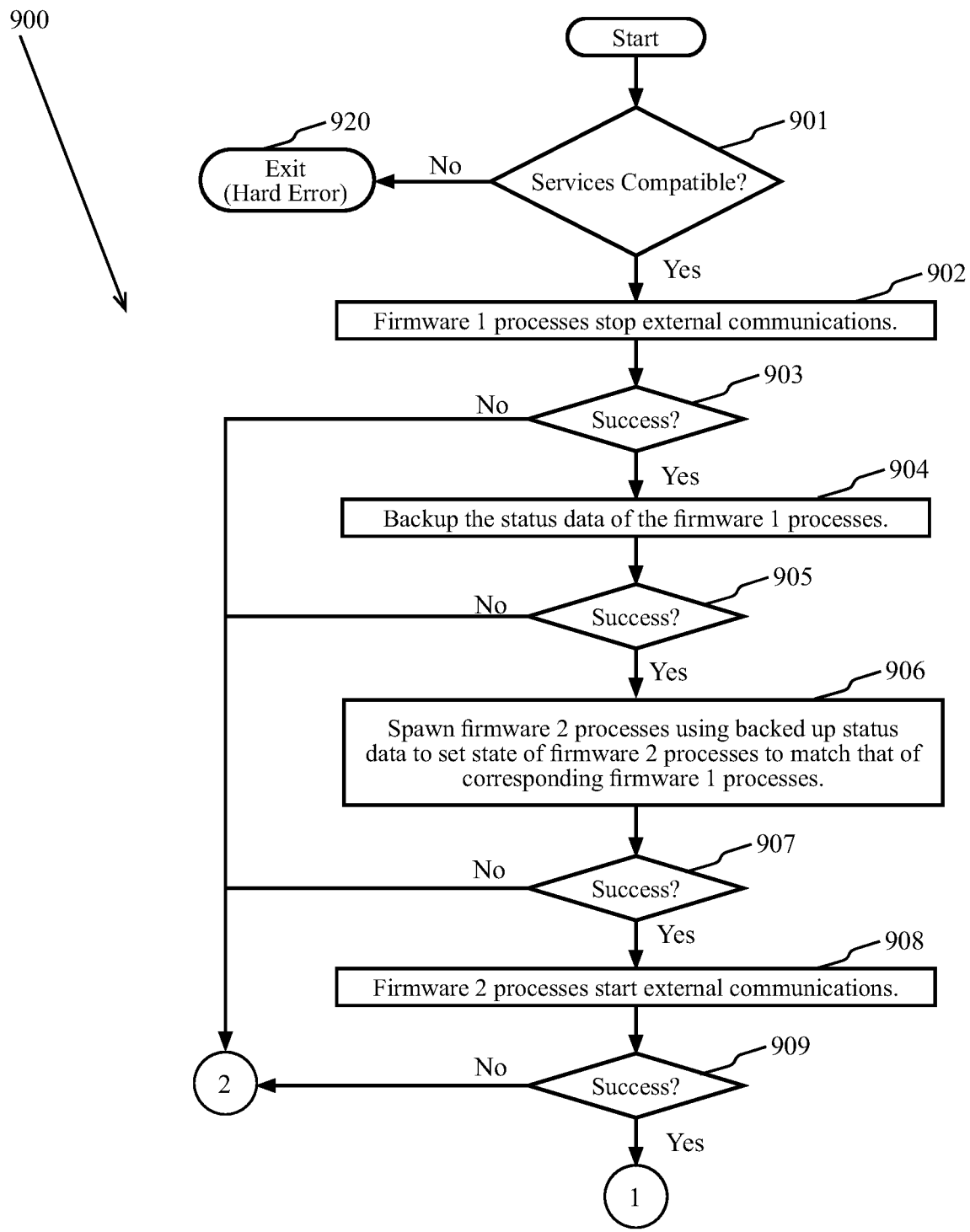
FIGS. 9A and 9B are a high-level flow diagram illustrating an automated upgrade process with hitless rollback for upgrading a network appliance according to some aspects.
Figure 9B:
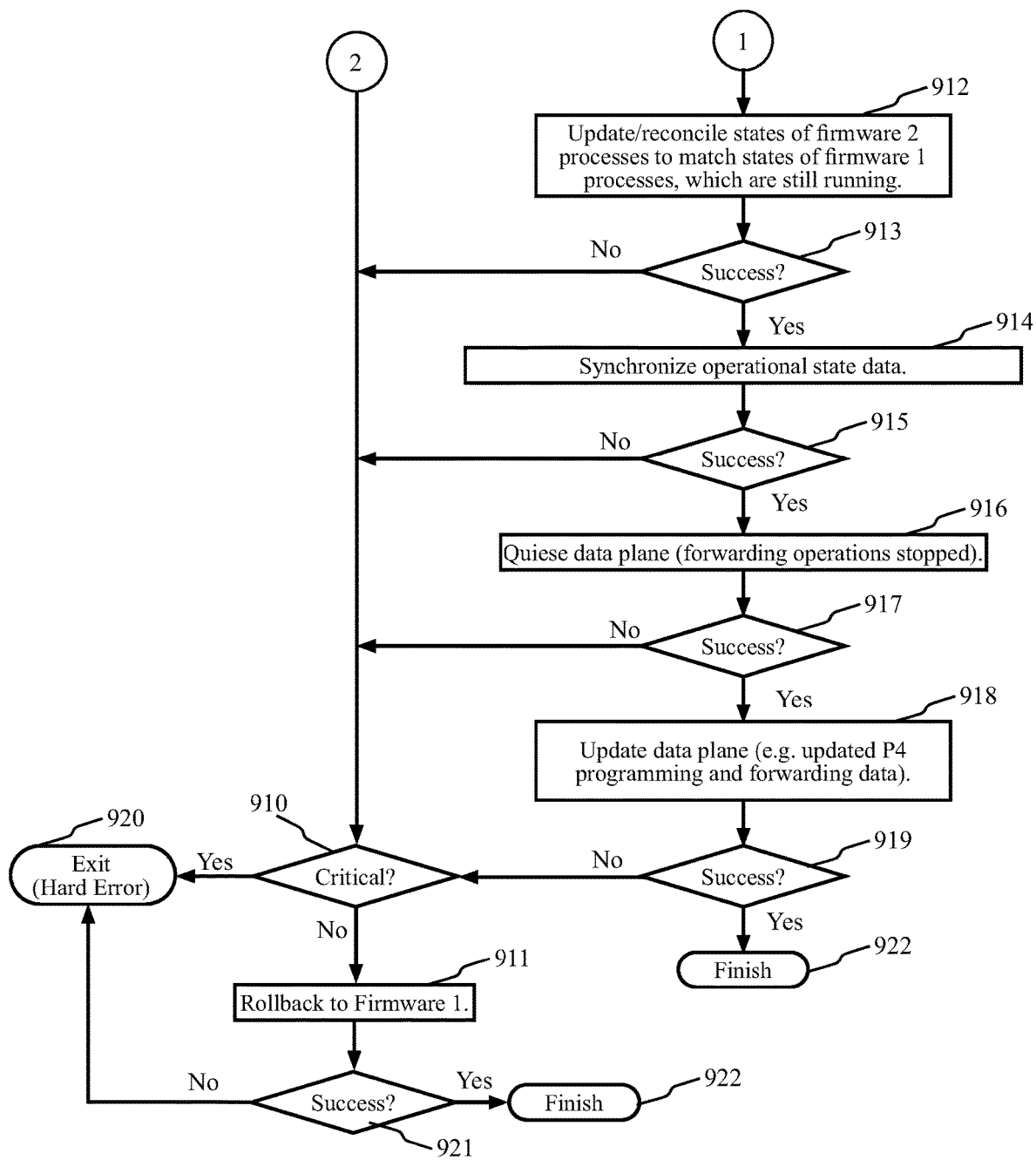

FIG. 7 illustrates a network appliance 604 installed in a host computer 601 during a hitless upgrade process according to some aspects. The process of upgrading from the first firmware 607 to the second firmware 701 can go through a set of stages and a failure at any one of those stages can result in rolling back to the first firmware 607. FIGS. 9A and 9B below detail stages of a hitless upgrade process that may roll back an upgrade to a previous version.

A second firmware 701 has been loaded into the control plane and is running. The second firmware 701 includes a second process 702. The network appliance's memory 612 stores the second process status data 703 for the second process 702. As discussed above, the first process 608 provides a service. The second process 702 can provide that same service after the upgrade process if the upgrade process is successful. Processes have states that evolve over time. A snapshot of a process' state can be taken at a particular time and can be used to restart the process in the state it was in when the snapshot was taken. The configuration state 711 records the state of the first process at a particular time, the configuration state time. The configuration state can be used to restart the first process in the configuration state. The configuration state can be translated, if required, to initialize the second process state data 703. Translation may be required when an upgraded first data structure used by the second firmware differs from a first data structure used by the first firmware. A translation program can read in state data (e.g., configuration state data 711) using the data structure used by the first firmware and can write out the upgraded state data using the upgraded first data structure, thereby translating the data for use by the second process. As such, the second process can be spawned in a consistent state. The consistent state is the configuration state translated for use by the second process.

The first process may continue running after the configuration state time. In many embodiments, the first process is responsive to the host machine 601 and the VMs during the upgrade process. As such, the first process may receive state changing inputs after the configuration state time. The state changing inputs can be recorded as operational state data 710. The operational state data may be used to update the second process state data 703. For example, immediately before switching service provision from the first process to the second process, the first process may be stopped and the operational state data used to update the second process. The two-stage technique of spawning the second process in the consistent state and then using operational state data to update the second process minimizes the amount of time during which the service is not provided.

The data plane 609 may also be upgraded during the upgrade process. For example, certain P4 programs may be updated, data structures used by the packet processing pipeline 610 may be updated, etc. The data plane 609 uses forwarding data 614 to process network traffic flows and that forwarding data can be stored in forwarding data structures that may be accessed by the match-action units in a packet processing pipeline. The forwarding data structures can be stored in static random-access memory (SRAM), content-addressable memory such as ternary content-addressable memory (TCAM), or some other type of memory. The SRAM and TCAM may be partitioned during the upgrade process such that forwarding data compatible with the first firmware is in one partition while the second partition stores forwarding data compatible with the second firmware. Storing state, translating state, and updating state are discussed above. In some embodiments, the SRAM and TCAM may not be large enough to store the first partition and a second partition. In such embodiments, a shadow memory region 707 in the memory (e.g., off ASIC memory 432 or on ASIC memory 416) can store the updated forwarding data 708 for the packet processing pipeline. The updated forwarding data 708 can be copied into the pipeline local memory during the upgrade process.

Some processes in the second data structure use the same data structures as are used by a process in the first data structure. For example, a gRPC server may have updated executable code that does not alter the process' stored status or data structures. In such cases, there is no need to translate the data structures. In fact, the second firmware process can use the very same in memory data that is being used by the first firmware process. In such a case, switching over from the first firmware process to the second firmware process may be accomplished by stopping the first firmware process and starting the second firmware process such that the second firmware process uses the in memory data that the first firmware process was using. In some embodiments, the data can be stored in a shared memory. The first firmware process and the second firmware process can both access data in the shared memory.

Figure 8:
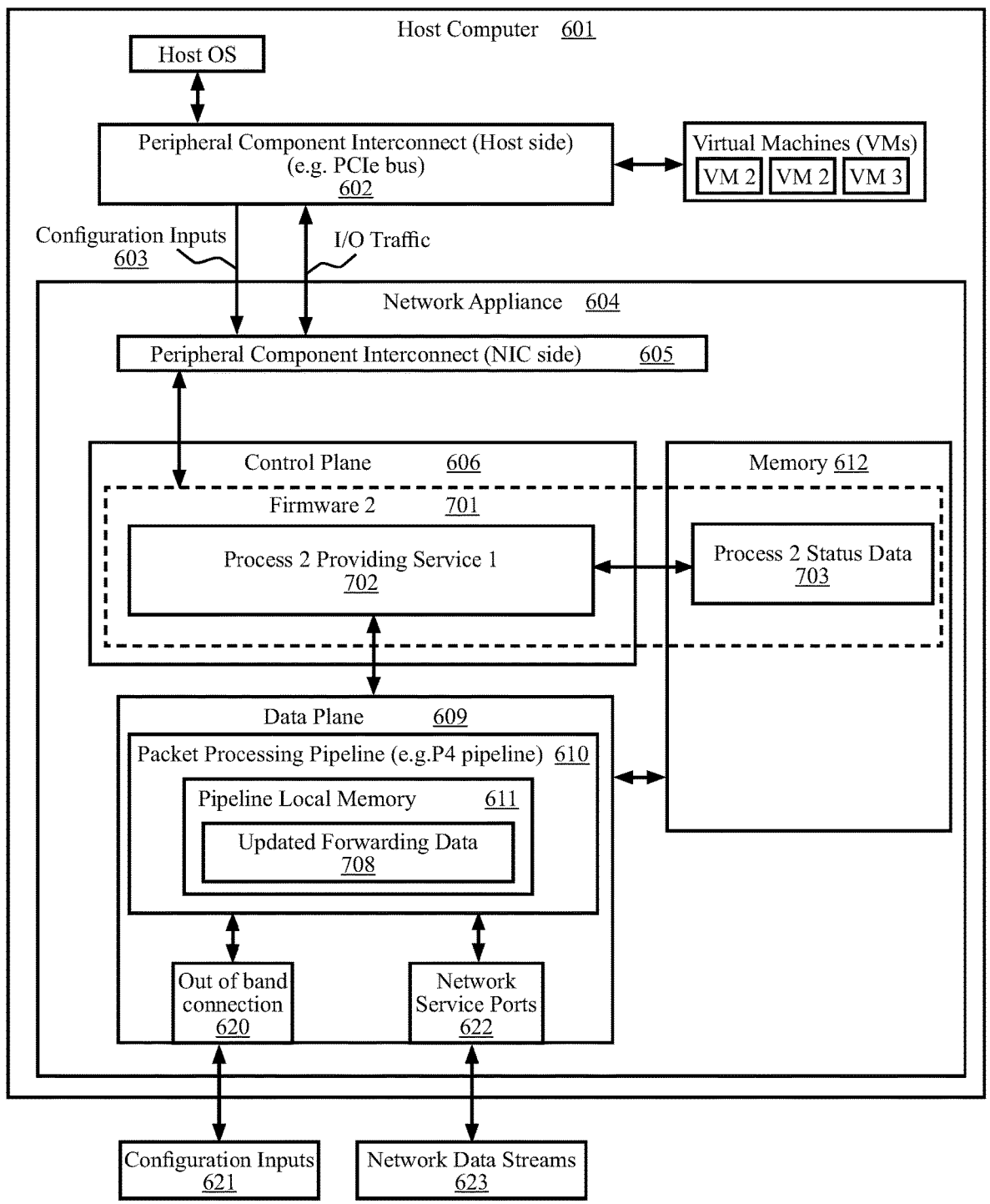
FIG. 8 illustrates a network appliance installed in a host computer after a hitless upgrade process according to some aspects.

FIG. 8 illustrates a network appliance 604 installed in a host computer 601 after a hitless upgrade process according to some aspects. The first firmware is no longer present and the network appliance 604 is running the second firmware 701. The second process 702 is providing the first service and is using the second process status data 703 in the memory 612. The packet processing pipeline 610 is using the updated forwarding data 708 in the pipeline local memory. Here, the upgrade has been successful. The hitless rollback mechanism was not required. If a rollback had occurred, the network appliance could be configured as shown in FIG. 6.

FIGS. 9A and 9B are a high-level flow diagram illustrating an automated upgrade process with hitless rollback 900 for upgrading a network appliance according to some aspects. At block 901, a compatibility check can be performed to determine if the current versions of the services provided by the first firmware (currently running) and the second firmware are compatible. The versions are compatible if the first firmware can be upgraded to the second firmware via the automated upgrade process being used. For example, the data structures used by the control plane and the data plane are either the same in both versions or can be translated to the new version. A translation program, often hand coded, may translate a data structure from one version to another version. As such, a compatibility check may be successful if the data structures are the same between versions, a translation program is provided, the data structures can be reinitialized without impacting the services, etc. If the services are not compatible, the upgrade process exits 920. The exit 920 is a hard error. Hard errors indicate that the process stopped abruptly without using the rollback mechanism.

If the versions are compatible, the first firmware can stop external communications to the first firmware processes 902. External communications can include network data streams 623 received via the network service ports 622. The first firmware processes can include gRPC, PCIeMgr, DataPlaneMgr, domain name service (DNS) server, etc. At block 903 the process checks for successful completion of stopping external communications to the first firmware processes. If not successful, the upgrade process proceeds to block 910. At block 910, the upgrade process checks if the failure is critical. A critical failure can be detected by a return code or exit code produced by a process such as a firmware process, the upgrade process, or another process that is performing a task (such as shutting down communications, translating data structures, etc.) for the upgrade process. If the failure is critical, then the upgrade process exits 920. If the failure is not critical, the upgrade process attempts to roll back to the first firmware 911. At block 912, the process checks if the rollback was successful. If the rollback was successful, the upgrade process finishes 922. Otherwise, the upgrade process exits 920 with a hard error.

In many cases, the upgrade process can roll back to the first firmware by unloading the second firmware and deleting data structures that were created for the second firmware. For example, the processes of the second firmware may be running but not providing services because the services have not yet been switched over to use second firmware processes. As such, unloading the second firmware rolls back the upgrade.

Returning now to block 903, after successful completion of stopping external communications to the first firmware processes, the upgrade process can backup the status data of the first firmware processes 904. This creates the configuration state data discussed above. At block 905, the upgrade process determines if the status data was successfully backed up. If not, the upgrade process continues to block 910. If successful, the upgrade process continues to block 906. At block 906, the upgrade process spawns the second firmware processes using the backed-up status data (configuration state data) to set the state of the second firmware processes to match those of corresponding first firmware processes.

At block 907, the upgrade process determines if spawning the second firmware processes was successful. If not, the upgrade process continues to block 910. If successful, the upgrade process continues to block 908. At block 908, the upgrade opens up external communications for the second firmware processes. At block 909, the upgrade process determines if opening up external communications for the second firmware processes was successful. If not, the upgrade process continues to block 910. If successful, the upgrade process continues to block 912. At block 912, the upgrade process updates or reconciles the states of the second firmware processes to match the states of the first firmware processes, which are still running. At block 913, the upgrade process determines if updating the states of the second firmware process to match the states of the first firmware processes was successful. If not, the upgrade process continues to block 910. If successful, the upgrade process continues to block 914. At block 914, the upgrade process synchronizes the operation state data. For example, the operational state data can include configuration inputs that were processed by the first firmware. Those inputs can be provided to the second firmware to thereby synchronize the operation state data. At block 915, the upgrade process determines if synchronizing the operation state data was successful. If not, the upgrade process continues to block 910. If successful, the upgrade process continues to block 916.

At block 916, the upgrade process can quiesce the data plane. Quiescing the data plane can include stopping all forwarding operations. For example, the packet processing pipeline may be frozen. At block 917, the upgrade process determines if quiescing the data plane succeeded. If not, the upgrade process continues to block 910. If successful, the upgrade process continues to block 918. At block 918, the upgrade process updates the data plane. Updating the data plane can include updating the P4 programming, updating the forwarding data, updating data structures for the forwarding data, etc. At block 919, the upgrade process determines if updating the data plane was successful. If not, the upgrade process continues to block 910. If successful, the upgrade process finishes 922.

Figure 10:
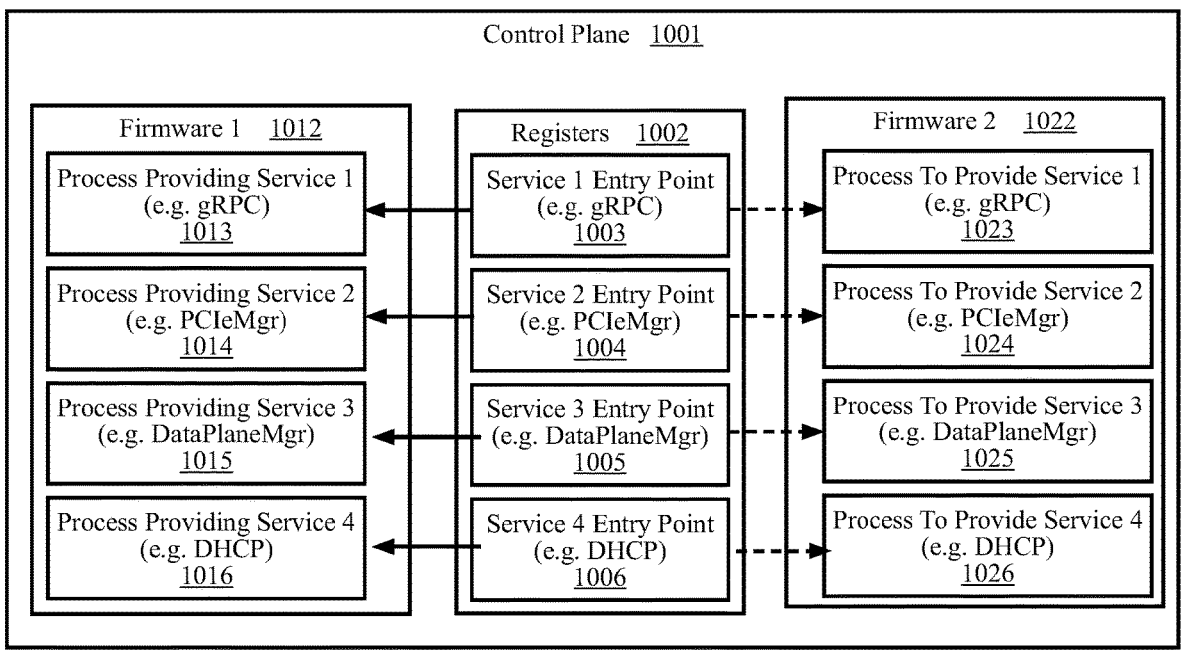
FIG. 10 illustrates registers that store entry points for processes implementing services according to some aspects.

FIG. 10 illustrates registers that store entry points for processes implementing services according to some aspects. Software processes can be executed when a process or thread branches to an entry point or otherwise uses an entry point to indicate executable code. The control plane can include registers 1002 that store entry points for the services provided by the network appliance. The registers can include a first service entry point 1003, a second service entry point 1004, a third service entry point 1005 and a fourth service entry point.

Before upgrading, the registers 1002 can point to entry points for the services provided by first firmware 1012. The first firmware process providing the first service 1013 (e.g., gRPC) can be executed using the first service entry point 1003. The first firmware process providing the second service 1014 (e.g., PCIeMgr) can be executed using the second service entry point 1004. The first firmware process providing the third service 1015 (e.g., DataPlaneMgr) can be executed using the third service entry point 1005. The first firmware process providing the fourth service 1016 (e.g., DHCP) can be executed using the fourth service entry point 1006.

The upgrade process can write entry points for the second firmware process into the registers 1002. After upgrading, the registers 1002 can point to entry points for the services provided by second firmware 1022. The second firmware process providing the first service 1023 (e.g., gRPC) can be executed using the first service entry point 1003. The second firmware process providing the second service 1024 (e.g., PCIeMgr) can be executed using the second service entry point 1004. The second firmware process providing the third service 1025 (e.g., DataPlaneMgr) can be executed using the third service entry point 1005. The second firmware process providing the fourth service 1026 (e.g., DHCP) can be executed using the fourth service entry point 1006.

Upgrading a network appliance can include switching over from first firmware processes to second firmware processes. The network appliance can switch over from a first firmware process to a second firmware process by setting one of the registers 1002 to indicate the second firmware process. Rolling back the upgrade can include setting the registers to point at the first firmware processes.

Figure 11:
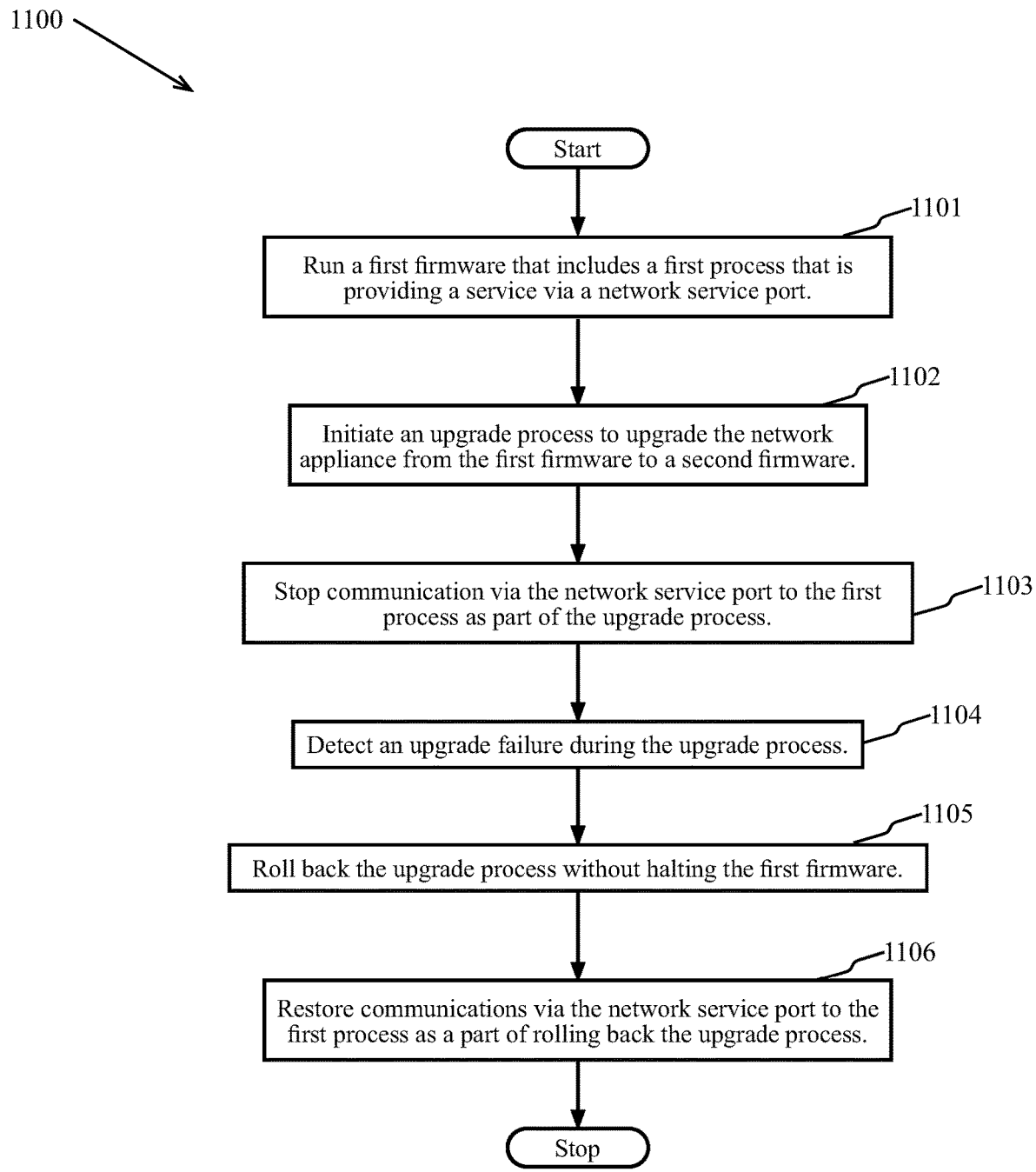
FIG. 11 is a high-level flow diagram illustrating a method for a hitless rollback mechanism during software upgrade of a network appliance according to some aspects.

FIG. 11 is a high-level flow diagram illustrating a method for a hitless rollback mechanism during software upgrade of a network appliance 1100 according to some aspects. After the start, at block 1101 the process runs a first firmware that includes a first process that is providing a service via a network service port. At block 1102 the process initiates an upgrade process to upgrade the network appliance from the first firmware to a second firmware. At block 1103 the process stops communication via the network service port to the first process as part of the upgrade process. At block 1104 the process detects an upgrade failure during the upgrade process. At block 1105 the process rolls back the upgrade process without halting the first firmware. At block 1106 the process restores communications via the network service port to the first process as part of rolling back the upgrade process.

Figure 12:
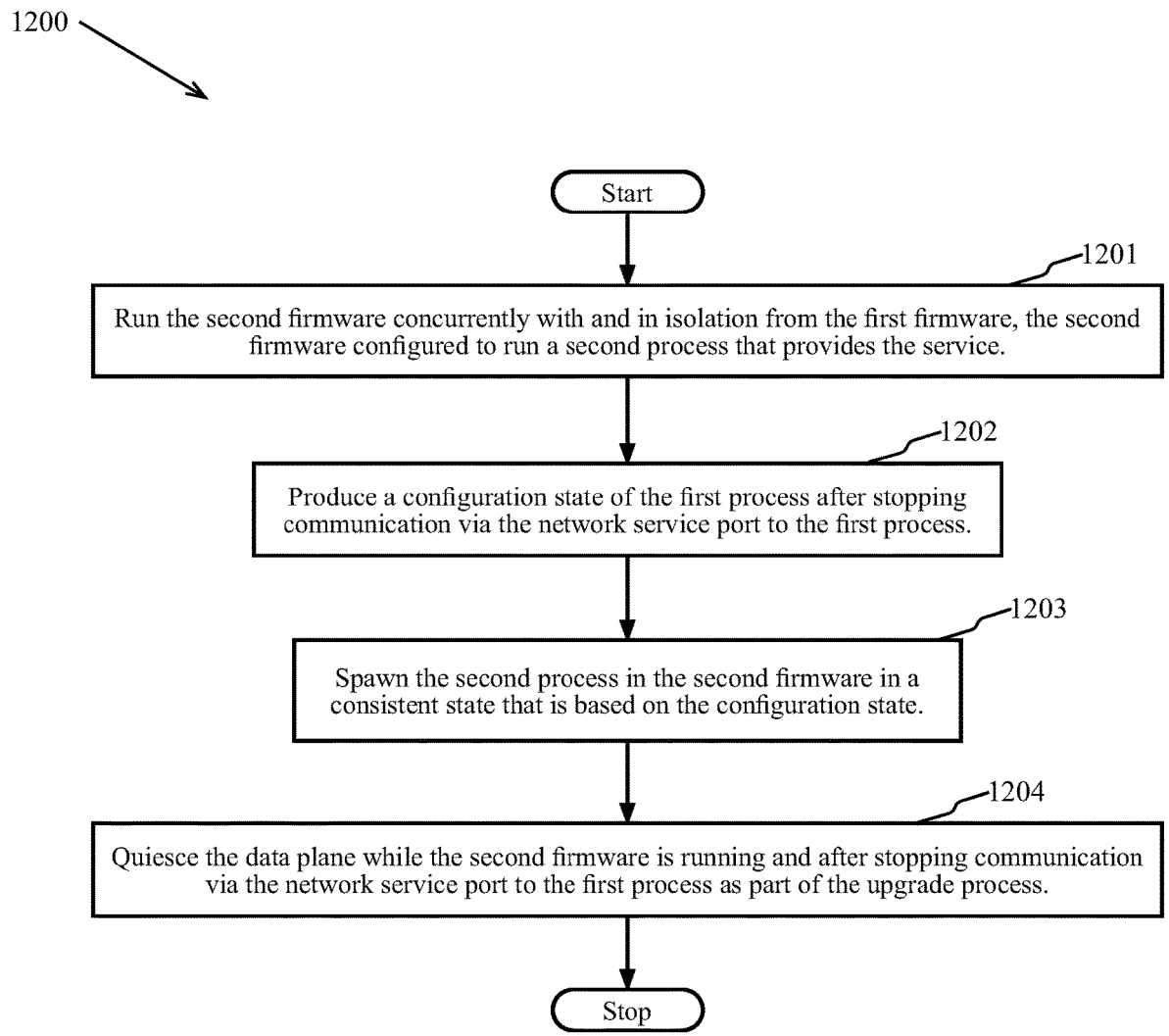
FIG. 12 is a high-level flow diagram illustrating bringing up the second firmware in isolation from the first firmware according to some aspects.

FIG. 12 is a high-level flow diagram illustrating bringing up the second firmware in isolation from the first firmware 1200 according to some aspects. After the start, at block 1201 the process can run the second firmware concurrently with and in isolation from the first firmware, the second firmware configured to run a second process that provides the service. At block 1202 the process can produce a configuration state of the first process after stopping communication via the network service port to the first process. At block 1203 the process can spawn the second process in the second firmware in a consistent state that is based on the configuration state. At block 1204 the process can quiesce the data plane while the second firmware is running and after stopping communication via the network service port to the first process as part of the upgrade process. The second firmware is in isolation from the first firmware when neither firmware can access the data that is being used by the other firmware. For example, the first firmware and the second firmware may access different copies of the data, but not the same copy of the data.

Figure 13:
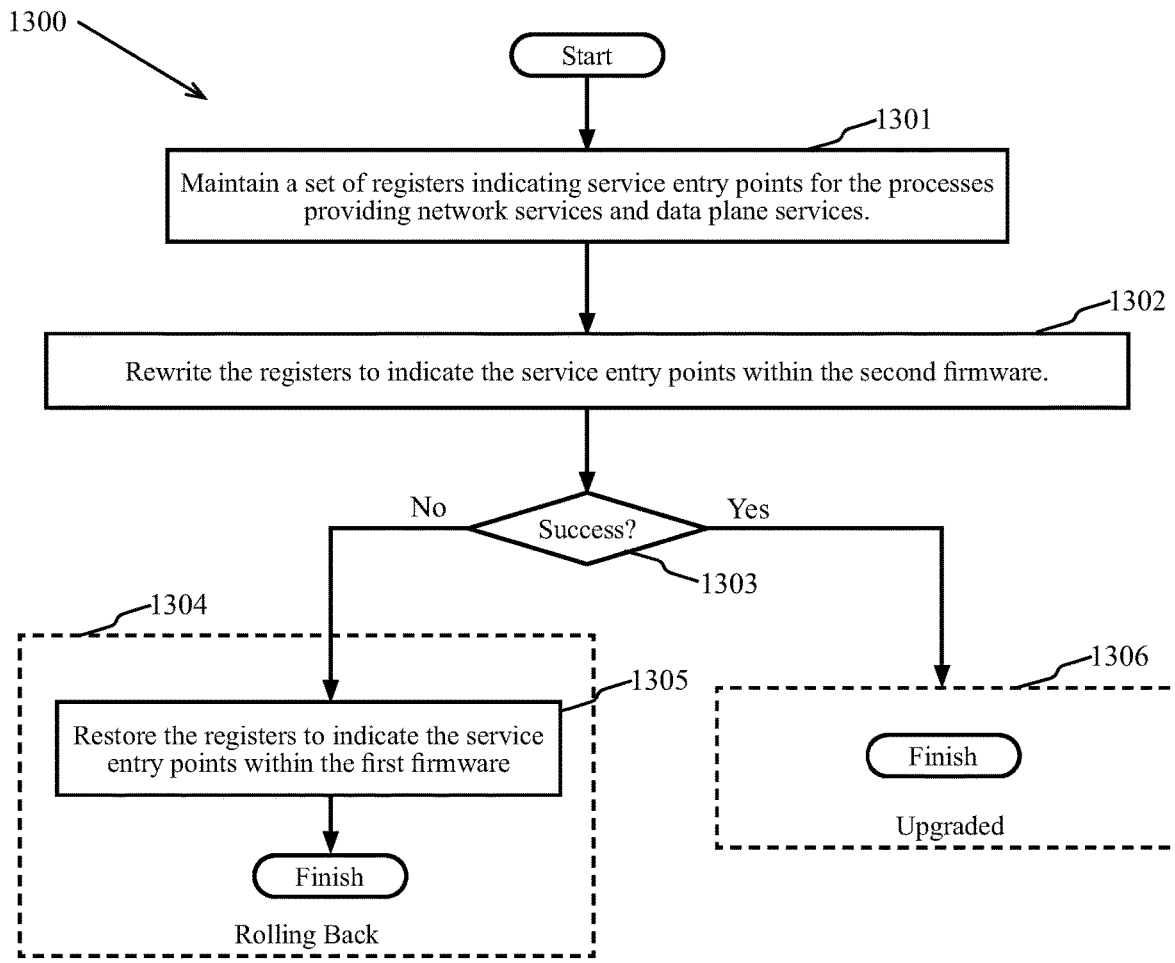
FIG. 13 is a high-level flow diagram illustrating updating device registers according to some aspects.

FIG. 13 is a high-level flow diagram illustrating updating device registers 1300 according to some aspects. After the start, at block 1301 the process can maintain a set of registers indicating service entry points for the processes providing network services and data plane services. At block 1302 the process can rewrite the registers to indicate the service entry points within the second firmware. At block 1303, the process can determine if the upgrade was successful. If the upgrade was successful, then the network appliance is upgraded 1306 and the process can finish. If the upgrade process was not successful then the process can begin rolling back 1304. As part of rolling back, at block 1305 the process can restore the registers to indicate the service entry points within the first firmware.

Figure 14:
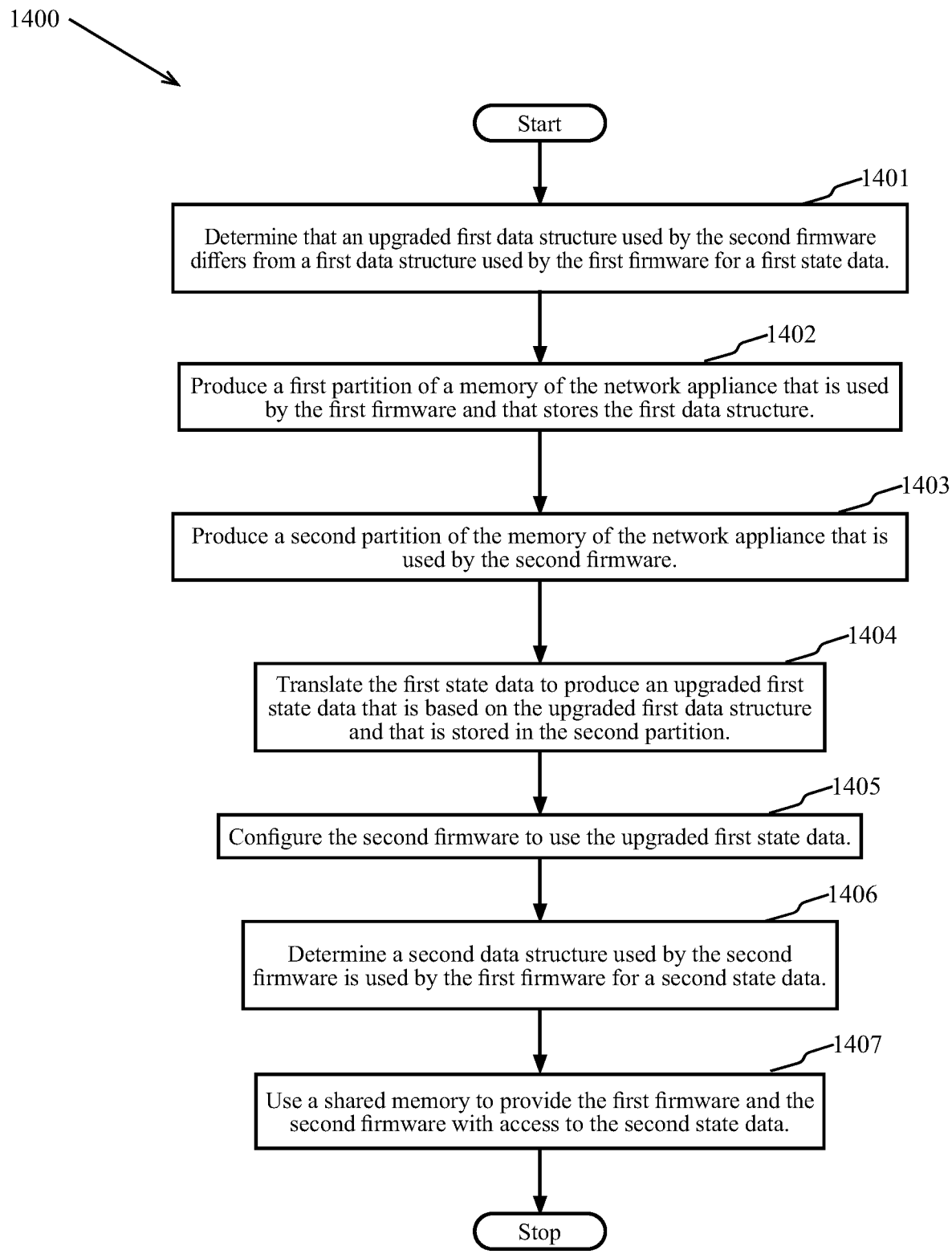
FIG. 14 is a high-level flow diagram illustrating partitioning the memory of the network appliance according to some aspects.

FIG. 14 is a high-level flow diagram illustrating partitioning the memory of the network appliance 1400 according to some aspects. After the start, at block 1401 the process can determine that an upgraded first data structure used by the second firmware differs from a first data structure used by the first firmware for a first state data. At block 1402 the process can produce a first partition of a memory of the network appliance that is used by the first firmware and that stores the first data structure. At block 1403 the process can produce a second partition of the memory of the network appliance that is used by the second firmware. At block 1404 the process can translate the first state data to produce an upgraded first state data that is based on the upgraded first data structure and that is stored in the second partition. At block 1405 the process can configure the second firmware to use the upgraded first state data. At block 1406 the process can determine a second data structure used by the second firmware is used by the first firmware for a second state data. At block 1407 the process can use a shared memory to provide the first firmware and the second firmware with access to the second state data.

Figure 15:
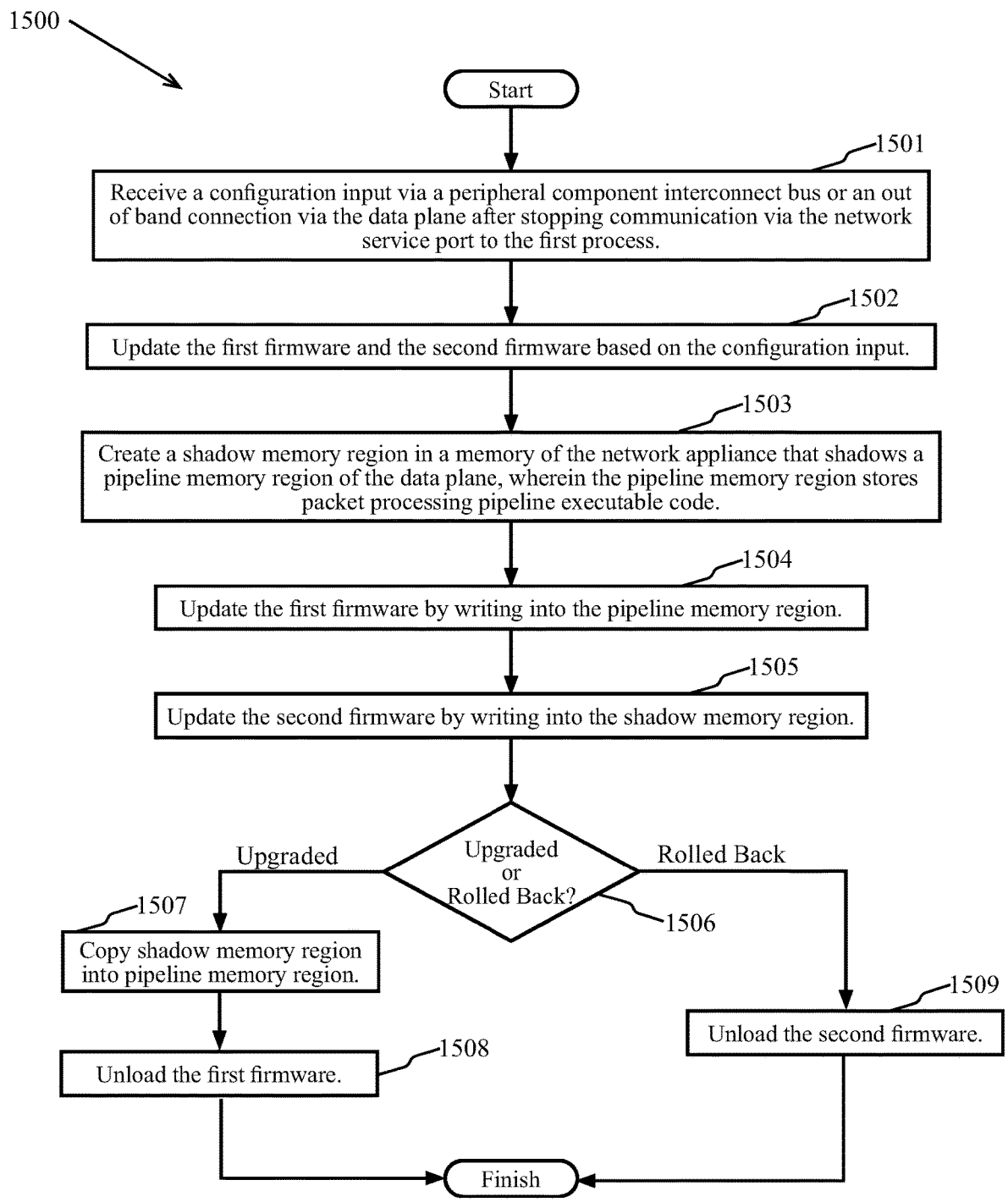
FIG. 15 is a high-level flow diagram illustrating creating and using a shadow memory according to some aspects.

FIG. 15 is a high-level flow diagram illustrating creating and using a shadow memory 1500 according to some aspects. After the start, at block 1501 the process can receive a configuration input via a peripheral component interconnect bus or an out of band connection via the data plane after stopping communication via the network service port to the first process. At block 1502 the process can update the first firmware and the second firmware based on the configuration input. At block 1503 the process can create a shadow memory region in a memory of the network appliance that shadows a pipeline memory region of the data plane, wherein the pipeline memory region stores packet processing pipeline executable code. At block 1504 the process can update the first firmware by writing into the pipeline memory region. At block 1505 the process can update the second firmware by writing into the shadow memory region. At block 1506, the process can determine if the network appliance is upgraded to the second firmware or has been rolled back to the first firmware. If the network appliance has been upgraded, the process can proceed to block 1507. At block 1507, the process can copy the shadow memory region into pipeline memory region. At block 1508 the process can unload the first firmware. If the network appliance has been rolled back, the process can proceed to block 1509. At block 1509 the process can unload the second firmware.

Aspects described above can be ultimately implemented in a network appliance that includes physical circuits that implement digital data processing, storage, and communications. The network appliance can include processing circuits, ROM, RAM, CAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). The network appliance may be embodied as a single IC device (e.g., fabricated on a single substrate) or the network appliance may be embodied as a system that includes multiple IC devices connected by, for example, a printed circuit board (PCB). The interfaces may include network interfaces (e.g., Ethernet interfaces and/or InfiniBand interfaces) and/or PCI Express (PCIe) interfaces. The interfaces may also include other management and control interfaces such as I2C, general purpose IOs, USB, UART, SPI, and eMMC.

As used herein the terms "packet" and "frame" may be used interchangeably to refer to a protocol data unit (PDU) that includes a header portion and a payload portion and that is communicated via a network protocol or protocols. A PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method implemented by a network appliance, the method comprising:
   running a first firmware that includes a first process that is providing a service via a network service port;
   initiating an upgrade process to upgrade the network appliance from the first firmware to a second firmware;
   stopping communication via the network service port to the first process as part of the upgrade process;
   creating a shadow memory region in a memory of the network appliance that shadows a pipeline memory region of a data plane of the network appliance as part of the upgrade process;
   detecting an upgrade failure during the upgrade process;
   rolling back the upgrade process without halting the first firmware; and
   restoring communications via the network service port to the first process as part of rolling back the upgrade process.

2. The method of claim 1, wherein the upgrade process includes:
   running the second firmware concurrently with and in isolation from the first firmware, the second firmware configured to run a second process that provides the service;
   producing a configuration state of the first process after stopping the communication via the network service port to the first process;
   spawning the second process in the second firmware in a consistent state that is based on the configuration state; and
   detecting the upgrade failure as an error related to the second process.

3. The method of claim 2, wherein:
   the upgrade process includes quiescing the data plane of the network appliance while the second firmware is running and after stopping the communication via the network service port to the first process as part of the upgrade process;
   the upgrade process includes configuring the network appliance to provide the service via the second process; and
   rolling back the upgrade process includes configuring the network appliance to provide the service via the first process.

4. The method of claim 2, wherein:
   the upgrade process includes producing a first memory partition and a second memory partition in a memory of the network appliance;
   a plurality of first firmware processes are loaded in the first memory partition;
   a plurality of second firmware processes are loaded in the second memory partition;
   the first process is one of the first firmware processes; and
   the second process is one of the second firmware processes.

5. The method of claim 1, wherein:
   the network appliance includes a memory configured to store a plurality of registers indicating a plurality of service entry points for a plurality of processes providing a plurality of services;
   the upgrade process includes rewriting the registers to indicate the service entry points within the second firmware; and
   rolling back the upgrade process includes restoring the registers to indicate the service entry points within the first firmware.

6. The method of claim 1, wherein the upgrade process includes:
   determining that an upgraded first data structure used by the second firmware differs from a first data structure used by the first firmware for a first state data;
   translating the first state data to produce an upgraded first state data based on the upgraded first data structure; and
   configuring the second firmware to access the upgraded first state data.

7. The method of claim 6, wherein the upgrade process includes:
   determining a second data structure used by the second firmware is used by the first firmware for a second state data; and
   using a shared memory to provide the first firmware and the second firmware with access to the second state data.

8. The method of claim 1, wherein the upgrade process includes:
   receiving a configuration input via a peripheral component interconnect bus or an out of band connection via the data plane of the network appliance after stopping the communication via the network service port to the first process; and
   updating the first firmware and the second firmware based on the configuration input.

9. The method of claim 8,
   wherein
   the pipeline memory region stores packet processing pipeline executable code.

10. The method of claim 1, wherein:
    the upgrade process includes unloading the first firmware; and
    rolling back the upgrade process includes unloading the second firmware.

11. A network appliance comprising:
    a memory;
    a data plane that includes packet processing circuitry;
    a pipeline memory region that is used by the packet processing circuitry; and
    a control plane configured to
       run a first firmware that includes a first process that is providing a service,
       initiate an upgrade process to upgrade the network appliance from the first firmware to a second firmware,
       stop communication via a network service port to the first process as part of the upgrade process,
       create a shadow memory region in the memory that shadows the pipeline memory region as part of the upgrade process,
       detect an upgrade failure during the upgrade process,
       roll back the upgrade process without halting the first firmware, and
       restore communications via the network service port to the first process after detecting the upgrade failure.

12. The network appliance of claim 11, wherein:
the upgrade process includes running the second firmware concurrently with and in isolation from the first firmware, the second firmware configured to run a second process that provides the service;
the upgrade process includes producing a configuration state of the first process after stopping the communication via the network service port to the first process;
the upgrade process includes spawning the second process in the second firmware in a consistent state that is based on the configuration state; and
the upgrade process includes detecting the upgrade failure as an error related to the second process.

13. The network appliance of claim 12, wherein:
the upgrade process includes quiescing the data plane while the second firmware is running and after stopping the communication via the network service port to the first process;
the upgrade process includes configuring the network appliance to provide the service via the second process; and
rolling back the upgrade process includes configuring the network appliance to provide the service via the first process.

14. The network appliance of claim 13, wherein:
the upgrade process includes producing a first memory partition and a second memory partition in a memory of the network appliance;
a plurality of first firmware processes are loaded in the first memory partition;
a plurality of second firmware processes are loaded in the first memory partition;
the first process is one of the first firmware processes; and
the second process is one of the second firmware processes.

15. The network appliance of claim 11, wherein:
the upgrade process includes determining that an upgraded first data structure used by the second firmware differs from a first data structure used by the first firmware for a first state data;
the upgrade process includes partitioning a memory of the network appliance;
the upgrade process includes translating the first state data to produce an upgraded first state data based on the upgraded first data structure; and
the upgrade process includes configuring the second firmware to access the upgraded first state data.

16. The network appliance of claim 15, wherein:
the upgrade process includes determining a second data structure used by the second firmware is used by the first firmware for a second state data; and
the upgrade process includes using a shared memory to provide the first firmware and the second firmware with access to the second state data.

17. The network appliance of claim 11, wherein:
the upgrade process includes receiving a configuration input via a peripheral component interconnect bus or an out of band connection via the data plane after stopping the communication via the network service port to the first process; and
the upgrade process includes updating the first firmware and the second firmware based on the configuration input.

18. The network appliance of claim 17, wherein:
the pipeline memory region stores packet processing pipeline executable code.

19. A network appliance comprising:
a data plane;
a means for running a first firmware concurrently with a second firmware;
a means for upgrading the network appliance from the first firmware to the second firmware without restarting the network appliance;
a means for stopping communication via a network service port to the first firmware while upgrading;
a means for shadowing a pipeline memory region of the data plane;
a means for starting communication via the network service port to the second firmware while upgrading;
a means for detecting an upgrade failure while upgrading;
a means for rolling back the means for upgrading the network appliance without halting the first firmware; and
a means for restoring communications via the network service port to the first firmware after detecting the upgrade failure.

20. The network appliance of claim 19 further including
a means for configuring a first memory region for the first firmware;
a means for configuring a second memory region for the second firmware; and
a means for updating the first firmware and the second firmware based on a configuration input received after stopping communication via the network service port to the first firmware.

* * * * *